US012089003B2

(12) United States Patent
Kim

(10) Patent No.: US 12,089,003 B2
(45) Date of Patent: Sep. 10, 2024

(54) DISPLAY APPARATUS WITH MULTIPLE SUPPORTING MEMBERS

(71) Applicant: LG Display Co., Ltd., Seoul (KR)

(72) Inventor: Kwangho Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/948,181

(22) Filed: Sep. 19, 2022

(65) Prior Publication Data

US 2023/0040792 A1 Feb. 9, 2023

Related U.S. Application Data

(62) Division of application No. 17/086,300, filed on Oct. 30, 2020, now Pat. No. 11,483,662, which is a division of application No. 16/427,644, filed on May 31, 2019, now Pat. No. 10,863,281.

(30) Foreign Application Priority Data

Mar. 29, 2019 (KR) ........................ 10-2019-0037501

(51) Int. Cl.
*H04R 17/00* (2006.01)
*H04R 1/02* (2006.01)
*H04R 7/04* (2006.01)

(52) U.S. Cl.
CPC ............. *H04R 17/00* (2013.01); *H04R 1/028* (2013.01); *H04R 7/045* (2013.01); *H04R 2499/15* (2013.01)

(58) Field of Classification Search
CPC ........ H04R 17/00; H04R 1/028; H04R 7/045; H04R 2499/15
See application file for complete search history.

(56) References Cited

U.S. PATENT DOCUMENTS

| | | | |
|---|---|---|---|
| 6,629,341 | B2 | 10/2003 | Wilkie et al. |
| 7,197,798 | B2 | 4/2007 | Wilkie et al. |
| 8,712,079 | B2 | 4/2014 | Kim et al. |
| 8,873,776 | B2 | 10/2014 | Kim et al. |
| 10,863,281 | B2 | 12/2020 | Kim |
| 2003/0056351 | A1 | 3/2003 | Wilkie et al. |

(Continued)

FOREIGN PATENT DOCUMENTS

| | | | |
|---|---|---|---|
| CN | 1980485 | A | 6/2007 |
| CN | 105096778 | A | 11/2015 |

(Continued)

OTHER PUBLICATIONS

Second Office Action dated Mar. 4, 2022, issued in corresponding Chinese Patent Application No. 201910485562.2. Note: CN108370224A cited therein is already of record.

(Continued)

*Primary Examiner* — Mark Fischer
(74) *Attorney, Agent, or Firm* — Morgan, Lewis & Bockius LLP

(57) ABSTRACT

A display apparatus includes a display panel configured to display an image; a plate on a rear surface of the display panel; a rear structure on a rear surface of the plate and configured to support the display panel; a vibration member configured to vibrate the plate; and a first supporting member between a periphery of the plate and the rear structure.

34 Claims, 8 Drawing Sheets

II-II'

(56) References Cited

U.S. PATENT DOCUMENTS

| | | | | |
|---|---|---|---|---|
| 2004/0040132 | A1 | 3/2004 | Wilkie et al. | |
| 2004/0246109 | A1 | 12/2004 | Suzuki et al. | |
| 2005/0054390 | A1 | 3/2005 | Touvinen | |
| 2007/0132911 | A1 | 6/2007 | Fujiwara et al. | |
| 2010/0158283 | A1 | 6/2010 | Kim et al. | |
| 2010/0315370 | A1 | 12/2010 | Tuovinen | |
| 2011/0043454 | A1 | 2/2011 | Modarres et al. | |
| 2012/0148073 | A1 | 6/2012 | Kim et al. | |
| 2013/0167881 | A1* | 7/2013 | Korbler | H10N 30/092 29/25.35 |
| 2015/0130625 | A1 | 5/2015 | Tuovinen | |
| 2015/0341714 | A1 | 11/2015 | Ahn et al. | |
| 2016/0154462 | A1 | 6/2016 | Haga et al. | |
| 2017/0105294 | A1* | 4/2017 | Shimoda | H05K 5/0017 |
| 2017/0344053 | A1* | 11/2017 | Kim | H10K 50/8423 |
| 2019/0037165 | A1 | 1/2019 | Lee et al. | |
| 2019/0045286 | A1 | 2/2019 | Kim et al. | |
| 2019/0267533 | A1* | 8/2019 | Ito | H10N 30/88 |
| 2020/0264702 | A1* | 8/2020 | Park | H04M 1/026 |

FOREIGN PATENT DOCUMENTS

| | | | |
|---|---|---|---|
| CN | 105654851 | A | 6/2016 |
| CN | 106097911 | A | 11/2016 |
| CN | 107437590 | A | 12/2017 |
| CN | 107561753 | A | 1/2018 |
| CN | 108370224 | A | 8/2018 |
| CN | 109308849 | A | 2/2019 |
| CN | 109391889 | A | 2/2019 |
| KR | 10-2010-0073075 | A | 7/2010 |
| KR | 10-2015-0133918 | A | 12/2015 |
| KR | 10-2016-0015348 | A | 2/2016 |
| KR | 10-2017-0076548 | A | 7/2017 |
| KR | 10-1760484 | B1 | 7/2017 |
| WO | 2017/111377 | A1 | 6/2017 |

OTHER PUBLICATIONS

Office Action dated Sep. 3, 2021, issued in corresponding Chinese patent application No. 201910485562.2.

English machine translation of WO 2017/111377 A1 (Park et al., Input Device and Electronic Device Comprising Same, published Jun. 2017) (Year: 2017).

Office Action issued Dec. 2, 2023 for corresponding Korean Patent Application No. 10-2019-0037501 Note: KR 10-2017-0076548 A was cited in prior IDS.

* cited by examiner

DISPLAY APPARATUS WITH MULTIPLE SUPPORTING MEMBERS

CROSS-REFERENCE TO RELATED APPLICATIONS

This application is a divisional of U.S. patent application Ser. No. 17/086,300, filed on Oct. 30, 2020, which is a divisional of U.S. patent application Ser. No. 16/427,644, filed on May 31, 2019, now U.S. Pat. No. 10,863,281, which claims the benefit of the Korean Patent Application No. 10-2019-0037501 filed on Mar. 29, 2019, the entirety of each of which is hereby incorporated by reference as if fully set forth herein.

BACKGROUND

Technical Field

The present disclosure relates to a display apparatus.

Description of the Related Art

Generally, a display apparatus is built into an electronic product or a home appliance product, such as a television monitor, a notebook computer, a smartphone, a tablet computer, an electronic pad, a wearable device, a watch phone, a portable information device, a navigator, or a vehicle control display device, to be used as a screen for displaying an image.

A general display apparatus may include a display panel for displaying an image, and a sound system for outputting a sound related to the image. However, because sound output from the sound system of the general display apparatus travels a rearward or downward direction of the display apparatus, sound quality may be deteriorated due to interference between sounds reflected from a wall or the ground. Thus, it may be difficult to perform an exact sound transfer, and an immersion experience of a viewer may be interrupted.

For example, the sound system may be an actuator that includes a magnet and a coil. However, if the sound system including an actuator is applied to a display apparatus, the display apparatus may become thick. In this respect, a piezoelectric element capable of implementing a thin profile has been spotlighted.

However, due to its brittleness property, a piezoelectric element may be damaged by an external impact. Thus, there may be a sound reproduction reliability problem.

SUMMARY

Accordingly, embodiments of the present disclosure are directed to a display apparatus that substantially obviates one or more of the problems due to limitations and disadvantages of the related art.

An aspect of the present disclosure is to provide a display apparatus comprising a sound generating module on a rear surface of a display panel to generate a sound by vibrating the display panel, thereby improving a low-pitched reproduction band and improving flatness of a sound pressure.

Another aspect of the present disclosure is to provide a display apparatus comprising a sound generating module, which may lower a lowest pitched sound range that may be output by itself by reducing its resonance frequency.

Another aspect of the present disclosure is to provide a display apparatus that may reduce unnecessary vibration and improve flatness of a sound pressure by fixing each of both sides of a sound generating module to a display panel and a rear structure.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display apparatus comprises a display panel configured to display an image; a plate on a rear surface of the display panel; a rear structure on a surface of the plate opposite to the display panel and configured to support the display panel; a vibration member configured to vibrate the plate; and a first supporting member between a periphery of the plate and the rear structure.

In another aspect, a display apparatus comprises a display panel configured to display an image; a rear structure configured to support the display panel; and a plurality of sound generating modules between the display panel and the rear structure and configured to vibrate the display panel, wherein each of the plurality of sound generating modules includes: a plate between the display panel and the rear structure; a vibration member configured to vibrate the plate; and a first supporting member between a periphery of the plate and the rear structure.

The display apparatus according to the present disclosure comprises a sound generating module on a rear surface of a display panel to generate a sound by vibrating the display panel, whereby a low-pitched reproduction band may be improved and flatness of a sound pressure may be improved. The display apparatus may lower a lowest pitched sound range, which may be output by itself, by reducing its resonance frequency. The display apparatus may reduce unnecessary vibration and improve flatness of a sound pressure by fixing each of both sides of a sound generating module to a display panel and a rear structure.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
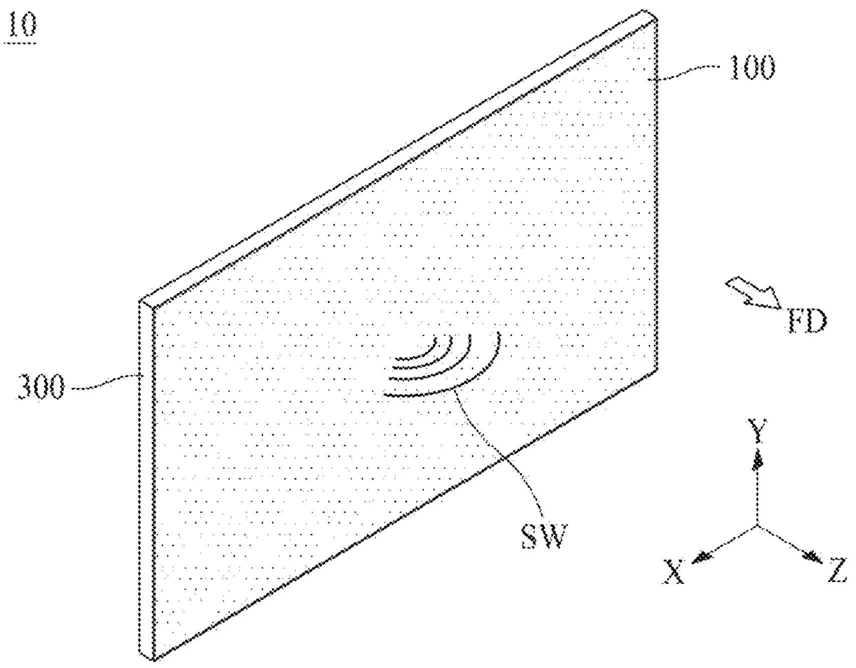
FIG. 1 is a perspective view illustrating a display apparatus according to an embodiment of the present disclosure.

Reference will now be made in detail to embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, when the position relationship two parts is described as, "on," "over," "under," or "next," one or more other parts between the two parts unless a more limiting term, such as "just" or "direct(ly)" is used.

In describing a time relationship, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship. Hereinafter, embodiments of a display apparatus according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the important point of the present disclosure, the detailed description will be omitted.

In the present disclosure, a "display apparatus" may include a liquid crystal module (LCM) or an organic light emitting display module (OLED), which includes a display panel and a driver for driving the display panel. The display apparatus may include a set electronic apparatus or set device (or set apparatus), such as a notebook computer, a television, a computer monitor, an automotive apparatus, an equipment apparatus of another vehicle type, and a mobile electronic apparatus such as a smartphone or an electronic pad, which correspond to complete products or final products including an LCM and an OLED module.

As the display panel in the present disclosure, all kinds of display panels such as a liquid crystal display panel, an organic light emitting diode (OLED) display panel, and an electroluminescent display panel may be used. The display panel in this embodiment is not limited to a specific display panel that may be vibrated by a sound generator to generate a sound. The display panel used in the display apparatus according to the embodiment of the present disclosure is not limited to a shape or size of the display panel.

For example, if the display panel is a liquid crystal display panel, the display panel includes a plurality of gate and data lines, and pixels formed in crossing areas of the gate lines and the data lines. Also, the display panel may include an array substrate including a thin film transistor, which is a switching element for controlling light transmittance in each pixel, an upper substrate including a color filter and/or a black matrix, and a liquid crystal layer formed between the array substrate and the upper substrate.

If the display panel is an OLED display panel, the display panel may include a plurality of gate and data lines, and pixels formed in crossing areas of the gate lines and the data lines. Also, the display panel may include an array substrate including a thin film transistor, which is an element for selectively applying a voltage to each pixel, an organic light emitting diode (OLED) layer on the array substrate, and an encapsulation substrate disposed on the array substrate to cover the OLED layer. The encapsulation substrate may protect the thin film transistor and the OLED layer from external impact, and may prevent water or oxygen from being permeated into the OLED layer. The layer formed on the array substrate may include an inorganic light emitting layer, for example, nano-sized material layer or quantum dot. Another example, the inorganic light emitting layer may include a micro light emitting diode.

Hereinafter, the display apparatus according to the present disclosure will be described in detail with reference to the accompanying drawings. Wherever possible, the same reference numbers will be used throughout the drawings to refer to the same or like parts. Scales of elements shown in the accompanying drawings are different from actual scales for convenience of description, and thus are not limited to the shown scales.

If a piezoelectric element is applied to the display apparatus to configure a sound system, because the piezoelectric element attached to a display panel is fixed to an entire area of the display panel, problems occur in that vibration is suppressed, it is difficult to reproduce a sound at a low pitched sound range due to rigidity of the display panel and a resonance frequency is increased to a high-pitched sound. In this respect, inventors of the present disclosure have invented a new type display apparatus comprising a sound generating module that can improve a sound of a low pitched sound range through several tests. This new type display apparatus will be described below.

Figure 2:
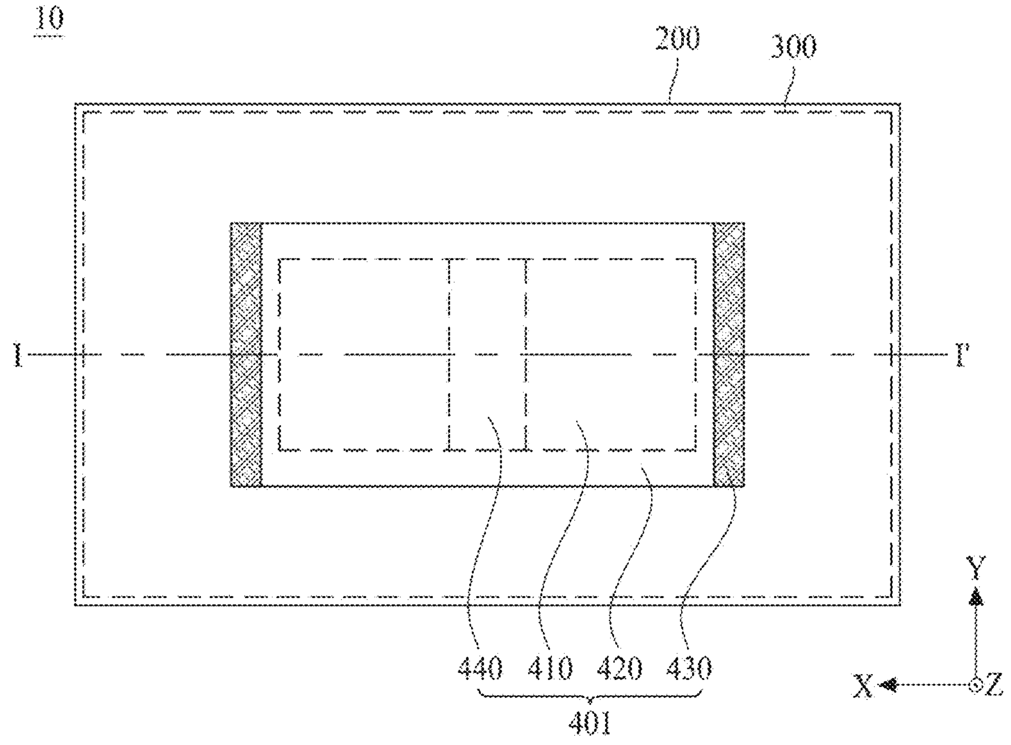
FIG. 2 is a rear view illustrating a first embodiment of a sound generating module in a display apparatus according to an embodiment of the present disclosure.
Figure 3:
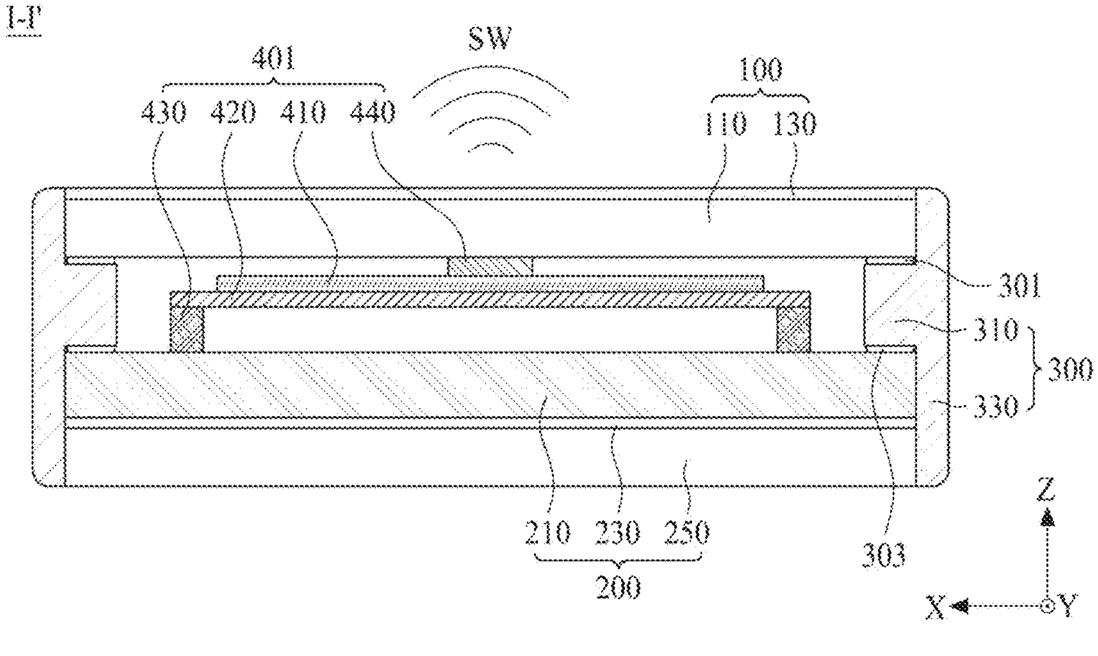
FIG. 3 is a cross-sectional view taken along line I-I' of FIG. 2.

FIG. 1 is a perspective view illustrating a display apparatus according to an embodiment of the present disclosure, FIG. 2 is a rear view illustrating a first embodiment of a sound generating module in a display apparatus according to an embodiment of the present disclosure, and FIG. 3 is a cross-sectional view taken along line I-I' of FIG. 2.

With reference to FIGS. 1 to 3, the display apparatus 10 includes a display module 100, a rear structure 200, a middle frame 300, and a sound generating module 401. The display module 100 may directly output a sound SW to a front direction FD while displaying an image by being vibrated in accordance with driving of at least one sound generating module 401. The display module 100 may directly output a sound SW to a front direction FD by being vibrated in accordance with driving of at least one sound generating module 401 while displaying an image. Therefore, the display module 100 may display an image and at the same time generate a sound SW.

The display module 100 may include a display panel 110 and a functional film 130. The display panel 110 may be implemented as all kinds of display panels such as an organic light emitting diode (OLED) display panel, a liquid crystal display panel, an electroluminescent display panel, a micro light emitting diode display panel, or a quantum dot light emitting display panel. The display panel 110 may be vibrated in accordance with vibration of the sound generating module 401 to directly output a sound SW to the front direction FD. Therefore, the display panel 110 may serve as a vibration plate or a speaker, which directly generates a sound SW. For example, when the display panel 110 generates a sound SW, the display panel 110 may be a vibration plate, a panel speaker of a plane speaker, which directly generates the sound SW.

The display panel 110 may include a pixel circuit on a substrate (base substrate), and a pixel array layer (or display portion) connected to the pixel circuit, having an anode electrode, a cathode electrode, and a light emitting layer. The display panel 110 may display an image in the form of a top emission mode, a bottom emission mode or a dual emission mode in accordance with a structure of the pixel array. In this case, the anode electrode may be expressed as, but is not limited thereto, a first electrode or a pixel electrode. The cathode electrode may be expressed as, but is not limited thereto, a second electrode or a common electrode. The top emission mode may display an image by emitting light generated from the pixel array layer to a front direction FD of the substrate of the display panel 110, and the bottom emission mode may display an image by emitting light generated from the pixel array layer to the outside through the substrate.

The functional film 130 may be attached to the display panel 110 by a transparent adhesive member. The adhesive member may include, but is not limited thereto, a pressure sensitive adhesive (PSA), an optically clear adhesive (OCA), or an optically clear resin (OCR).

According to an embodiment, the functional film 130 may include an anti-reflection layer (or anti-reflection film) for improving outdoor visibility and contrast ratio for an image displayed on the display panel 110 by preventing reflection of external light. For example, the anti-reflection layer may include a circular polarizing layer (or circular polarizing film) that shields reflective light reflected by a thin film transistor and/or lines on the pixel array layer of the display panel 110 from progressing to the outside.

According to an embodiment, the functional film 130 may further include a light path controlling layer (or light path controlling film) for controlling a path of light emitted from the pixel array layer of the display panel 110 to the outside. The light path controlling layer may include a structure that a high refractive layer and a low refractive layer are disposed alternately, whereby a path of light incident from the pixel array layer may be changed to minimize color shifting according to a viewing angle. At this time, the low refractive layer may be disposed on the uppermost layer of the light path controlling layer.

The rear structure 200 may be disposed on a rear surface of the display module 100 to support the display module 100. The rear structure 200 may be disposed on a rear surface of the sound generating module 401 configured to support a plate 420 of the sound generating module 401.

According to an embodiment, the rear structure 200 may cover the rear surface of the display module 100 and the rear surface of the sound generating module 401. For example, the rear structure 200 may be expressed as, but is not limited thereto, a supporting member, a housing, a system cover, a set cover, a back cover, a cover bottom, a rear frame or chassis. The rear surface of the display module 100 may be expressed as, but is not limited thereto, one surface, a first surface, a rear surface or a lower surface.

The rear structure 200 may include a first rear structure 210 and a second rear structure 250. The first rear structure 210 may be disposed on the rear surface of the display module 100 to cover the rear surface of the display module 100. According to an embodiment, the first rear structure 210 may be spaced apart from a rearmost surface of the display module 100 as much as a thickness of the sound generating module 410. The first rear structure 210 may fix the sound generating module 401 while supporting the sound generating module 401. The first rear structure 210 may protect the rear surface of the display module 100 from external impact. Also, the first rear structure 210 may emit or dissipate heat generated from the display module 100.

According to an embodiment, the first rear structure 210 may be a plate shaped member that covers the entire rear surface of the display module 100. For example, an edge (or periphery) portion or a corner portion of the first rear structure 210 may have a four-sided shape or a curved shape by a chamfering process or a corner rounding process.

According to an embodiment, the first rear structure 210 may be formed of a glass material, a metal material or a plastic material. For example, the first rear structure 210 of a glass material may include any one of a sapphire glass and a gorilla glass or a laminated structure (junction structure) of the sapphire glass and the gorilla glass. For example, the first rear structure 210 of a metal material may have, but is not limited thereto, any one of Al, Al alloy, Mg alloy, alloy of Fe and Ni, and stainless steel, their alloy material, or a junction structure.

The second rear structure 250 may be disposed on the rear surface of the first rear structure 210 to cover the rear surface of the first rear structure 210. According to an embodiment, the first second structure 250 may be a plate shaped member that covers the entire rear surface of the first rear structure 210. For example, an edge (or periphery) portion or a corner portion of the second rear structure 250 may have a four-sided shape or a curved shape by a chamfering process or a corner rounding process.

According to an embodiment, the second rear structure 250 may be formed of any one of a glass material, a metal material and a plastic material, or a material different from that of the first rear structure 250. For example, the second rear structure 250 may be formed of a glass material, and the first rear structure 310 may be formed of a metal material such as Al having excellent thermal conductivity. In this case, an external design of the display apparatus may be improved by the second rear structure 250 of a glass material disposed on the rearmost surface, and the rear surface of the display apparatus may be used as a mirror surface through the first rear structure 210 of a metal material.

The second rear structure 250 may have the same thickness as that of the first rear structure 210 or a thickness relatively thinner than the first rear structure 210 within an error range on a manufacturing process. For example, the first rear structure 210 may have a thickness relatively thicker than the second rear structure 250 to more stably support the sound generating module 401 and reduce a weight of the display apparatus.

The first rear structure 210 and the second rear structure 250 may be coupled to each other using a connection member 230. For example, the connection member 230 may be an adhesive resin, a double-sided tape or a double-sided adhesive foam pad, and may have elasticity to absorb impact.

The connection member 230 may be interposed in an entire area between the first rear structure 210 and the second rear structure 250. According to an embodiment, the connection member 230 may be formed in a network structure having an air gap between the first rear structure 210 and the second rear structure 250. In this case, a portion of the air gap may accommodate a cable or a signal transmission member connected to the sound generating module 401.

The middle frame 300 may be disposed between a periphery of a rear surface of the display module 100 and a periphery of a front surface of the rear structure 200. The middle frame 300 may support peripheries of each of the display module 100 and the rear structure 200 and surround peripheries of each of the display module 100 and the rear structure 200. The middle frame 300 may be provided with a gap space between the display module 100 and the rear structure 200. The gap space may be expressed as, but is not limited thereto, an air gap, a vibration space, or a sound generating module arrangement space.

According to an embodiment, the middle frame 300 may be coupled or connected to a periphery of a rear surface of the display module 100 using a first member 301, and may be coupled or connected to a periphery of a front surface of the rear structure 200 using a second member 303. The front surface of the rear structure 200 may be expressed as, but is not limited thereto, the other surface, a second surface, an upper surface, a forward surface. The middle frame 300 may be expressed as, but is not limited thereto, a middle cabinet, a middle cover, or a middle chassis.

According to an embodiment, the middle frame 300 may be formed of a metal material or a plastic material. For example, the middle frame 300 may be formed of a metal material to improve an external design of a side surface of the display apparatus and protect the side surface of the display apparatus.

The middle frame 300 may include a support portion 310 and a sidewall portion 330. The support portion 310 may be, but is not limited thereto, a first portion, and the sidewall portion 330 may be, but is not limited thereto, a second portion.

The support portion 310 may be interposed between the periphery of the rear surface of the display module 100 and a periphery of a front surface of the rear structure 200, whereby a gap space may be provided between the display module 100 and the rear structure 200. The front surface of the support portion 310 may be coupled or connected to the periphery of the rear surface of the display module 100 using the first member 301, and the rear surface of the support portion 310 may be coupled or connected to the periphery of the front surface of the rear structure 200 using the second member 303. The support portion 310 may have a thickness (or height) corresponding to an entire module thickness of the sound generating module 401. For example, the thickness of the support portion 310 may be adjusted in accordance with the thickness of the sound generating module 401 between the display module 100 and the rear structure 200, a thickness of the first member 301, and a thickness of the second member 303.

According to an embodiment, the support portion 310 may have, but is not limited thereto, a rectangular shaped single frame structure. For example, the support portion 310 may have a plurality of partition bar shapes between the periphery of the rear surface of the display module 100 and the periphery of the front surface of the rear structure 200.

The first member 301 may be disposed between the periphery of the rear surface of the display module 100 and the front surface of the support portion 310. For example, the first member 301 may be, but is not limited thereto, an adhesive resin, a double-sided tape or a double-sided adhesive foam pad.

The second member 303 may be disposed between the periphery of the front surface of the rear structure 200 and the rear surface of the support portion 310. For example, the second member 303 may be, but is not limited thereto, an adhesive resin, a double-sided tape or a double-sided adhesive foam pad. The second member 303 may be formed of a material different from that of the first member 301.

The sidewall portion 330 may vertically be coupled or connected to an outer side of the support portion 310 in parallel with a thick direction Z of the display apparatus. The sidewall portion 330 may protect outer side surfaces of the display module 100 and the rear structure 200 and improve an outer design of the side surface of the display apparatus by surrounding all of an outer side surface of the display module 100 and an outer side surface of the rear structure 200. According to an embodiment, the support portion 310 and the sidewall portion 330 of the middle frame 300 may be coupled or connected to each other to form a single body, whereby the middle frame 300 may have a frame structure with a "⊢" shaped sectional structure.

According to an embodiment, the display apparatus may include an adhesive member instead of the middle frame 300. The adhesive member may be interposed between the periphery of the rear surface of the display module 100 and the periphery of the front surface of the rear structure 200, whereby a gap space may be provided between the display module 100 and the rear structure 200. The adhesive member may have a thickness (or height) corresponding to the entire module thickness of the sound generating module 401. For example, the thickness of the adhesive member may be adjusted in accordance with the module thickness of the sound generating module 401 disposed between the display module 100 and the rear structure 200. This adhesive member may serve as the same function as that of the support portion 310 of the middle frame 300.

If the display apparatus includes the adhesive member instead of the middle frame 300, the rear structure 200 may include a sidewall cover portion that surrounds all of the outer side surface of the display module 100, the outer side surface of the rear structure 200, and the outer side surface of the adhesive member.

The sidewall cover portion may be extended from an end of the second rear structure 320 and bent vertically to be parallel with the thickness direction Z of the display apparatus. According to an embodiment, the sidewall cover portion may have a single sidewall structure or a Hemming structure. For example, the Hemming structure may be a structure that end portions of a random member are bent in a curved shape, and thus may be overlapped with each other or spaced apart from each other in parallel. For example, the sidewall cover portion having a Hemming structure may include a first sidewall extended from the end of the second rear structure 250 and bent in parallel with the thick direction Z of the display apparatus, and a second sidewall extended from an end of the first sidewall and bent in parallel with the first sidewall. The second sidewall may be disposed between the outer side of the display module 100 and the first sidewall. At this time, as the second sidewall is covered by the first sidewall without being exposed to the outermost side of the display apparatus, an external design of the display apparatus may be improved.

The sound generating module 401 may be disposed between the display module 100 and the rear structure 200 to vibrate the display module 100. For example, the sound generating module 401 may be disposed between the display module 100 and the rear structure 200 to directly vibrate the display module 100. According to an embodiment, the sound generating module 401 may be disposed at a rear center portion (or rear center area) of the display module 100 and vibrate the rear center portion of the display module 100, and the display module 100 may act as a vibration plate to generate a sound SW.

The rear surface of the sound generating module 401 may be covered by the rear structure 200, and thus may be sealed without being directly exposed to the outermost rear surface of the display apparatus 10. Therefore, the display apparatus 10 may have a clean back design in which the rear surface or a portion of the sound generating module 401 is not exposed or observed by a user because the rear surface of the sound generating module 401 is covered by the rear structure 200. As a result, an external design of the rear surface of the display apparatus 10 may be improved.

According to an embodiment, the sound generating module 401 may a single structure body or single structure modularized into one part. For example, the sound generating module 401 is manufactured in the form of a complete product by a modular process not an assembly process (or assembly process) of the display apparatus and then may be provided in a gap space between the display module 100 and the rear structure 200 by a relatively simple part mounting (or arrangement) process during the assembly process of the display apparatus. Therefore, in the display apparatus 10 according to the present disclosure, assembly of the sound generating module 401 may be improved during the assembly process between modules, whereby production yield may be improved.

According to an embodiment, the sound generating module 401 may directly or indirectly vibrate the display module 100. For example, the sound generating module 401 may directly vibrate the display panel 110 in contact with the display panel 110. For another embodiment, the sound generating module 401 may indirectly vibrate the display panel 110 through a vibration transfer member that is directly in contact with the display panel 110. For example, the vibration transfer member may be implemented in a corresponding sound generating module 401 or the display module 100. The vibration transfer member implemented in the sound generating module 401 may be a vibration transfer plate (or vibration transfer sheet) which is in contact with (or coupled to or connected to) the display panel 110. The vibration transfer member implemented in the display module 100 may be a backlight module disposed on the rear surface of the display panel 110, or may be a vibration transfer plate (or heat dissipation plate) coupled (or attached or connected) to the rear surface of the display panel 110.

The sound generating module 401 may include a vibration member 410, a plate 420, a first supporting member 430, and a first adhesive member 440.

The vibration member 410 may be disposed between the plate 420 and the first adhesive member 440. The vibration member 410 may be disposed on one surface of the plate 420 facing the display panel 110. The vibration member 410 may be disposed on a front surface of the plate 420 to vibrate the plate 420, and may be disposed on a rear surface of the first adhesive member 440 and thus may be attached to the rear surface of the display panel 110 using the first adhesive member 440. Therefore, the vibration member 410 may transfer vibration to the display panel 110 through the first adhesive member 440.

According to an embodiment, the entire rear surface of the vibration member 410 may be attached to the plate 420, whereby degree of freedom in vibration may be more increased than that the entire front surface of the vibration member 410 is attached to the display module 100. For example, if the entire front surface of the vibration member 410 is attached to the display module 100, the vibration member 410 does not need a separate supporting member but degree of freedom in vibration is reduced, whereby a problem occurs in that sound pressure characteristic at a low pitched sound range is deteriorated. In this respect, because the display apparatus 10 according to the present disclosure includes a plate 420 that may maintain flatness higher than that of the vibration member 410, the vibration member 410 may be vibrated in a single body with the plate 420, and may be supported by the first supporting member 430 and spaced apart from the rear structure 200, whereby degree of freedom in vibration may be given. Because the vibration member 410 is attached to the display module 100 through the first adhesive member 440 having an area narrower than that of the vibration member 410, the vibration member 410 may be vibration more flexibly than that the entire front surface of the vibration member 410 is attached to the display module. Also, the vibration member 410 may efficiently transfer vibration of a high pitched sound range to the display panel 110 through the first adhesive member 440 having rigidity higher than that of the first supporting member 430. Therefore, the vibration member 410 may be spaced apart from each of the display module 100 and the rear structure 200, the entire rear surface of the vibration member 410 is attached to the front surface of the plate 420, whereby the vibration member 410 may stably be supported by the plate 420 even without decrease of degree of freedom in vibration, and vibration transfer property of the high pitched sound range may be improved through the first adhesive member 440. Therefore, the display apparatus 10 according to the present disclosure may improve a low-pitched reproduction band and prevent a sound pressure from being reduced at the high pitched sound range by lowering a resonance frequency.

According to an embodiment, the vibration member 410 may be implemented in a film shape including an electroactive material. The vibration member 410 may be expressed as, but is not limited thereto, a film actuator, a film type piezoelectric composite actuator, a film speaker, a film type piezoelectric speaker or a film type piezoelectric composite speaker, which uses the display panel 110 as a vibration plate.

The plate 420 may be disposed between the display module 100 and the rear structure 200. The plate 420 may be disposed between the display panel 110 and the first supporting member 430. The plate 420 may be disposed on the rear surface of the vibration member 410, whereby vibration generated from the vibration member 410 may be transferred to the plate 420. Therefore, the plate 420 may be vibrated in a single body with the vibration member 410 to perform a function of the vibration plate.

According to an embodiment, the front surface of the plate 420 may be in contact with the vibration member 410, and the periphery of the rear surface of the plate 420 may be in contact with the first supporting member 430. For example, the vibration member 410 may be disposed at a center portion of the front surface of the plate 420, and the first supporting member 430 may be disposed at the periphery of the rear surface of the plate 420 so as not to overlap the vibration member 410. Therefore, the first supporting member 430 may support the periphery of the rear surface of the plate 420, and may fix the plate 420 to the rear structure 200.

According to an embodiment, the plate 420 may include a material having high rigidity or stiffness, thereby improving vibration transfer property of the sound generating module 401. For example, the plate 420 may be, but is not limited thereto, a metal having excellent vibration transfer property, such as aluminum (Al), copper (Cu), and stainless steel, or a reinforced plastic compound. The front surface of the plate 420 may be attached to the entire rear surface of the vibration member 410 and, thus, vibrated in a single body with the vibration member 410.

The first supporting member 430 may be between the periphery of the plate 420 and the rear structure 200. According to an embodiment, the first supporting member 430 may be disposed at some periphery of a plurality of peripheries surrounding the rear surface of the plate 420. For example, the first supporting member 430 may be disposed at left and right peripheries of the rear surface of the plate 420 to fix the left and right peripheries of the plate 420 to the rear structure 200 and space upper and lower peripheries of the plate 420 apart from the rear structure 200. Therefore, the first supporting member 430 may be disposed at some periphery of the plurality of peripheries of the rear surface of the plate 420 to prevent a sealing space from being formed between the plate 420 and the rear structure 200.

The rear structure 200 and the display module 100 are bonded or attached to each other after the vibration member 410 is disposed at the rear structure 200. Because the position of the vibration member 410 is not fixed if there is no first supporting member 430, there is a difficult in process during bonding between the rear structure 200 and the display module 100. For example, because the first supporting member 430 is disposed at the rear structure 200, the position of the vibration member 410 may previously be fixed to the display module 100, whereby a process may easily be performed during bonding or attaching process between the rear structure 200 and the display module 100. Therefore, because first supporting member 430 may serve to perform an alignment function during the bonding process between the display module 100 and the rear structure 200, the position of the vibration member 410 may be fixed or adjusted. For example, because the first supporting member 430 may be firstly attached to the rear structure 200 to perform the alignment function, the position of the vibration member 410 may be adjusted, and assembly process between the display module 100 and the rear structure 200 may be improved.

For example, if a specific member is disposed between the plurality of peripheries surrounding the rear surface of the plate 420 and the rear structure 200 and thus a sealing space is formed between the plate 420 and the rear structure 200, an area of the plate 420 that performs a function of a vibration plate may be restricted or limited. If the specific member surrounds at least one area of the rear surface of the plate 420, the plate 420 performs the function of the vibration plate per area surrounded by the specific member, whereby the area as the vibration plate is reduced. Therefore, a vibration transfer efficiency of the plate 420 is reduced without smooth vibration, whereby a problem occurs in that a sound pressure of a sound generated from the display apparatus is reduced.

Therefore, the display apparatus 10 according to the present disclosure may arrange or fix the plate 420 at or to the rear structure 200 even without restricting the vibration area of the plate 420 by arranging the first supporting member 430 at only some periphery of the plurality of peripheries surrounding the rear surface of the plate 420. Therefore, the display apparatus 10 may not fix or arrange the vibration area of the plate 420 per partial area (or partial section), and may reduce rigidity of the sound generating module 401 by increasing degree of freedom in vibration of the plate 420. The display apparatus 10 may improve a low-pitched reproduction band by reducing a resonance frequency.

According to an embodiment, rigidity of the first supporting member 430 may be lower than that of the first adhesive member 440. Also, the first supporting member 430 may include a material having high elasticity. Therefore, the first supporting member 430 may fix the plate 420 to the rear structure 200 and at the same time increase elasticity of the plate 420 (or elasticity of vibration of the plate 420) if the plate 420 is vibrated. Therefore, rigidity of the first supporting member 430 may be lower than that of the first adhesive member 440, whereby rigidity of the sound generating module 401 coupled (or fixed or connected) to the front surface of the rear structure 200 may be reduced, and the resonance frequency of the display apparatus 10 may be reduced.

The first adhesive member 440 may be between the rear surface of the display panel 110 and the front surface of the vibration member 410. The first adhesive member 440 may vibrate the display panel 110 by transferring vibration of the vibration member 410 to the display panel 110. According to an embodiment, the first adhesive member 440 may be a double-sided tape or adhesive, which includes an adhesive layer having excellent adhesion with each of the rear surface of the display panel 110 and the front surface of the vibration member 410. For example, the adhesive layer of the first adhesive member 440 may include epoxy, acryl, silicon or urethane. The adhesive layer of the first adhesive member 440 may further include an additive such as tackifier or adhesiveness enhancing agent, wax ingredient or anti-oxidizer, which prevents the first adhesive member 440 from being detached (or separated) from the display panel 110 by vibration of the vibration member 410. For example, the tackifier may be, but is not limited thereto, a rosin derive, the wax ingredient may be, but not limited to, Paraffin Wax, etc., and the anti-oxidizer may be, but is not limited thereto, a phenolic anti-oxidizer such as thiolester.

The first adhesive member 440 may be disposed at a center portion (or front center area) of the front surface of the vibration member 410. For example, the first adhesive member 440 may be disposed at the center portion of the front surface of the vibration member 410 in parallel with the first supporting member 430. According to an embodiment, among the front surface of the vibration member 410, an attachment area or an arrangement area of the vibration member 410 with the first adhesive member 440 may be smaller than an attachment area or an arrangement area of the vibration member 410, which is not attached with the first adhesive member 440. Among the front surface of the vibration member 410, the area of the front surface of the vibration member 410, which is not attached with the first adhesive member 440 may be spaced apart from the display panel 110 as much as the thickness of the first adhesive member 440. For example, if the first adhesive member 440 is disposed at the front center portion of the vibration member 410, both peripheries of the vibration member 410 may be spaced apart from the display panel 110 as much as the thickness of the first adhesive member 440. Therefore, the first adhesive member 440 may increase degree of freedom in vibration of the vibration member 410 to reduce rigidity of the sound generating module 401 by fixing one portion of the front surface of the vibration member 410 to the rear surface of the display panel 110 and spacing the other portion of the front surface of the vibration member 410 apart from the rear surface of the display panel 110. In this case, rigidity of the sound generating module 401 may be rigidity of the sound generating module coupled or connected to the rear surface of the display panel 110. Therefore, as the first adhesive member 440 may be disposed at the front center portion of the vibration member 410, rigidity of the sound generating module 401 may be more reduced than that the entire front surface of the vibration member 410 is attached to the rear surface of the display panel 110, and the resonance frequency of the display apparatus 10 may be lowered to improve a low-pitched reproduction band.

According to an embodiment, the display apparatus 10 may reduce rigidity of the sound generating module 401 coupled (or fixed or connected) to the rear surface of the display panel 110, whereby the resonance frequency of the display apparatus 10 may be reduced. If the resonance frequency (or natural frequency) of the display apparatus 10 is reduced and the sound generating module 401 receives a sound signal of low frequency, resonance may be generated in the display panel 110 to generate low-pitched vibration more smoothly, and a lowest pitched sound range, which may be output (or reproduced or generated) by the display apparatus 10, may be lowered. Therefore, the display apparatus may be provided, in which a low-pitched reproduction band may be improved and flatness of a sound pressure may be improved.

According to another embodiment, the first adhesive member 440 may include a hollow portion between the display panel 110 and the vibration member 410. The hollow portion of the first adhesive member 440 may be provided with an air gap between the display panel 110 and the vibration member 410. The air gap may reduce or minimize vibration loss due to the first adhesive member 440 by concentrating the sound wave (or sound pressure) according to vibration of the vibration member 410 on the display panel 110 without dispersing the sound wave (or sound pressure), thereby increasing sound pressure characteristic of a sound generated in accordance with vibration of the display panel 110.

A film type piezoelectric body or a piezoelectric composite body may be one structure body formed of piezoelectric ceramic. If the film type piezoelectric body is applied to the display apparatus, the entire front surface of the film type piezoelectric body may be attached to the rear surface of the display panel. Therefore, the film type piezoelectric body may be vibrated smoothly in a horizontal direction but cannot be vibrated sufficiently in a vertical direction (or forward-backward direction), whereby vibration of the film type piezoelectric body may be restricted. Therefore, the display apparatus cannot output a sound having a desired sound pressure to a front direction, whereby a problem occurs in that sound pressure characteristic at a low pitched sound range is deteriorated.

Therefore, the display apparatus 10 according to the present disclosure may increase a sound pressure of a high pitched sound range by transferring vibration of the vibration member 410 to the display panel 110 through the first adhesive member 440 having relatively high rigidity. For example, rigidity of the first adhesive member 440 may be higher than that of the first supporting member 430. The display apparatus 10 may increase degree of freedom in vibration of the vibration member 410 and the plate 420 and reduce rigidity of the sound generating module 401 by arranging the first adhesive member 440 at the front center portion of the vibration member 410 and arranging the first supporting member 430 at the rear surface periphery of the plate 420. For example, the first supporting member 430 may be, but is not limited thereto, silicon. Therefore, the resonance frequency of the display apparatus 10 may be reduced, whereby the lowest pitched sound range, which can be output (or reproduced or generated) by the display apparatus 10, may be reduced and thus the low-pitched reproduction band may be improved. Therefore, the display apparatus 10 comprising the sound generating module 401 according to the first embodiment may increase the sound pressure of the high pitched sound range, which is output therefrom, through the first adhesive member 440, and at the same time may improve flatness of the sound pressure by improving sound pressure characteristic at the low pitched sound range through the first supporting member 430. In the display apparatus 10 comprising the sound generating module 401 according to the first embodiment, because the vibration member 410 may be fixed by the first adhesive member 440 and the first supporting member 430, unnecessary vibration may be reduced during vibration of the vibration member 410, whereby flatness of the sound pressure may be improved.

Figure 4:
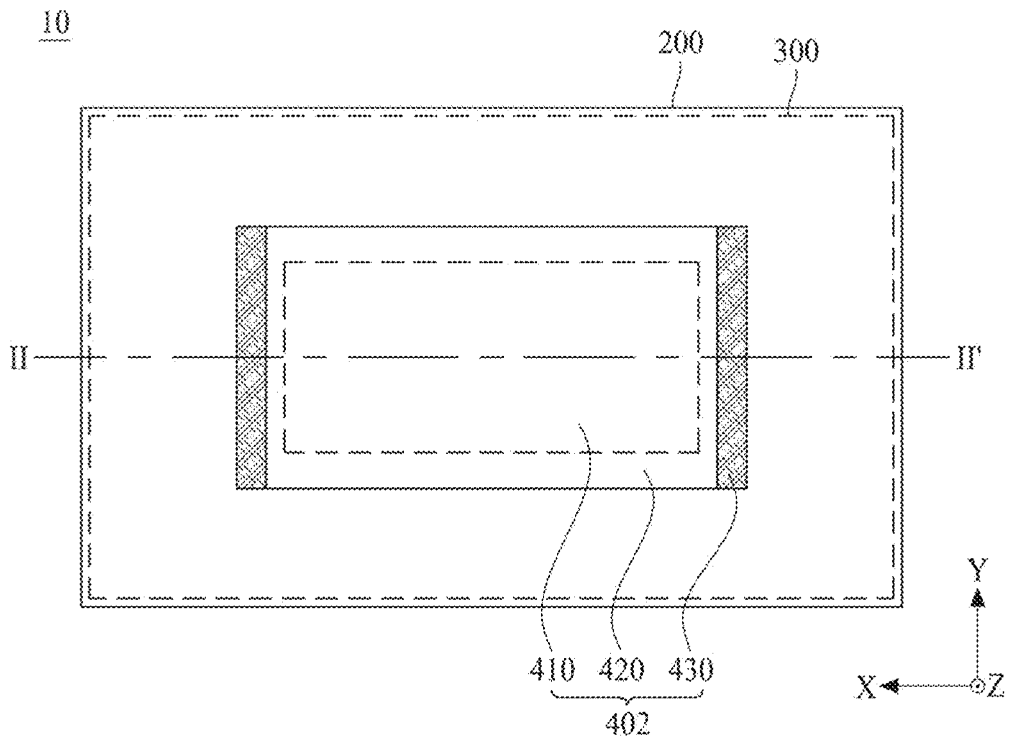
FIG. 4 is a rear view illustrating a second embodiment of a sound generating module in a display apparatus according to an embodiment of the present disclosure.
Figure 5:
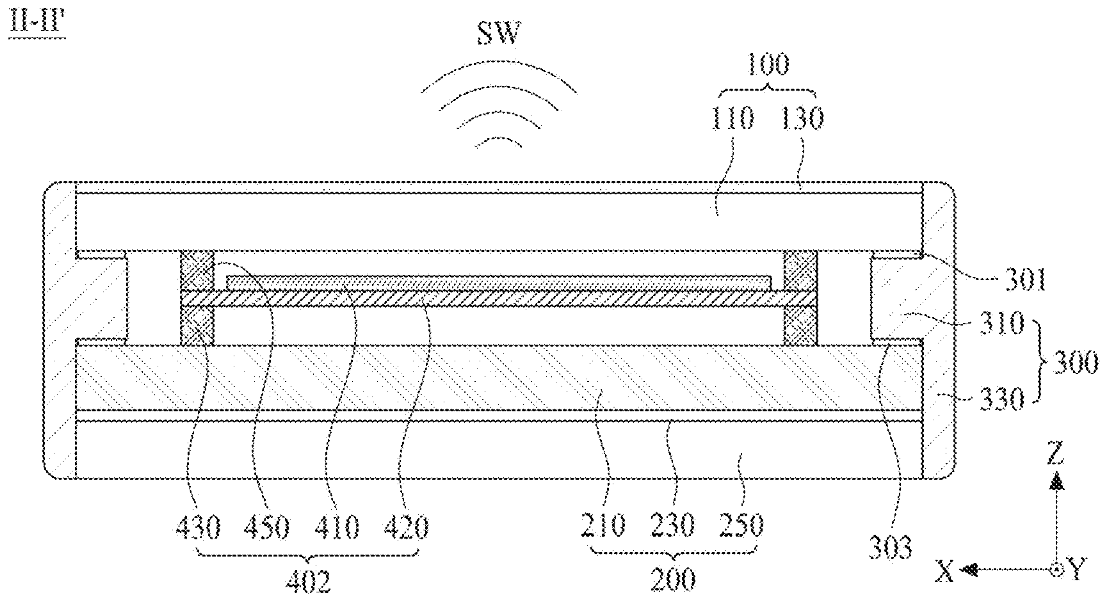
FIG. 5 is a cross-sectional view taken along line II-II' of FIG. 4.

FIG. 4 is a rear view illustrating a second embodiment of a sound generating module in a display apparatus according to an embodiment of the present disclosure, and FIG. 5 is a cross-sectional view taken along line II-II' of FIG. 4. Hereinafter, the same elements as those shown in FIGS. 2 and 3 will be described briefly or omitted.

With reference to FIGS. 4 and 5, the sound generating module 402 may include a vibration member 410, a plate 420, a first supporting member 430, and a second supporting member 450.

The vibration member 410 may be disposed between the plate 420 and the display panel 110. For example, the vibration member 410 may be disposed on one surface of the plate 420 facing the display panel 110, and may be spaced apart from the rear surface of the display panel 110. The vibration member 410 may be disposed on the front surface of the plate 420 to vibrate the plate 420. The vibration member 410 may be vibrated in a single body with the plate 420, thereby transferring vibration to the display module 100.

According to an embodiment, the entire rear surface of the vibration member 410 may be attached to the plate 420, whereby degree of freedom in vibration may be more increased than that the entire front surface of the vibration member 410 is attached to the display module 100. For example, if the entire front surface of the vibration member 410 is attached to the display module 100, the vibration member 410 does not need a separate supporting member but degree of freedom in vibration may be reduced, whereby a problem occurs in that sound pressure characteristic at a low pitched sound range is deteriorated. In this respect, in the display apparatus 10 according to the present disclosure, the vibration member 410 may be disposed to be spaced apart from the display module 100 and the rear structure 200, whereby degree of freedom in vibration may be given. If the vibration member 410 is disposed to be spaced apart from the rear structure 200, it is difficult to maintain flatness of the vibration member 410 due to a material of the vibration member 410, which is likely to be bent, and the vibration member may adjoin the display module 100 or the rear structure 200 to cause vibration interference. To solve this, the plate 420, which may maintain flatness, may be provided to prevent vibration interference from occurring, and the vibration member 410 may be vibrated in a single body with the plate 410. For example, the plate 420 having rigidity higher than that of the vibration member 410 may be provided, whereby the vibration member 410 may be vibrated in a single body with the plate 420. The plate 420 may be supported by the first supporting member 430 and the second supporting member 450, the vibration member 410 may be spaced apart from each of the display module 100 and the rear structure 200, and degree of freedom in vibration of the vibration member 410 may be increased. Because vibration may be amplified by the resonance frequency according to property of the plate 420, sound quality may be improved. Therefore, the display apparatus 10 according to the present disclosure may improve the low-pitched reproduction band by lowering the resonance frequency.

The plate 420 may be disposed between the display module 100 and the rear structure 200. The plate 420 may be disposed between the first supporting member 430 and the second supporting member 450. The plate 420 may be disposed on the rear surface of the vibration member 410, whereby vibration generated from the vibration member 410 may be transferred to the plate 420. Therefore, the plate 420 may be vibrated in a single body with the vibration member 410 to perform a function of the vibration plate.

According to an embodiment, a periphery of a front surface of the plate 420 may be in contact with the second supporting member 450, and a periphery of a rear surface of the plate 420 may be in contact with the first supporting member 430. Therefore, the second supporting member 450 may support the periphery of the front surface of the plate 420 and fix the plate 420 to the display module 100. The first supporting member 430 may support the periphery of the rear surface of the plate 420 and fix the plate 420 to the rear structure 200. For example, the first supporting member 430 and the second supporting member 450 may be, but is not limited thereto, silicon. Therefore, the plate 420 may be fixed or connected between the display module 100 and the rear structure 200 through the first and second supporting members 430 and 450.

According to an embodiment, the plate 420 may include a material having high rigidity, thereby improving vibration transfer property of the sound generating module 402. For example, the plate 420 may be, but is not limited thereto, a metal having excellent vibration transfer property, such as aluminum (Al), copper (Cu), and stainless steel, or a reinforced plastic compound. The front surface of the plate 420 may be attached to the entire rear surface of the vibration member 410 and thus vibrated in a single body with the vibration member 410.

The first supporting member 430 may be interposed between the edge of the plate 420 and the rear structure 200. According to an embodiment, the first supporting member 430 may be disposed at some periphery of a plurality of peripheries surrounding the rear surface of the plate 420. For example, the first supporting member 430 may be disposed at left and right peripheries of the rear surface of the plate 420 to fix or connect the left and right peripheries of the plate 420 to the rear structure 200 and space upper and lower peripheries of the plate 420 apart from the rear structure 200. Therefore, the first supporting member 430 may be disposed at some periphery of the plurality of peripheries of the rear surface of the plate 420 to prevent a sealing space from being formed between the plate 420 and the rear structure 200.

For example, if a specific member is disposed between the plurality of edges surrounding the rear surface of the plate 420 and the rear structure 200 and thus a sealing space is formed between the plate 420 and the rear structure 200, an area of the plate 420 that performs a function of a vibration plate may be restricted. If the specific member surrounds at least one area of the rear surface of the plate 420, the plate 420 performs the function of the vibration plate per area surrounded by the specific member, whereby the area as the vibration plate is reduced. Therefore, a vibration transfer efficiency of the plate 420 is reduced without smooth vibration, whereby a problem occurs in that a sound pressure of a sound generated from the display apparatus is reduced.

Therefore, the display apparatus 10 according to the present disclosure may fix or connect the plate 420 to the rear structure 200 even without restricting the vibration area of the plate 420 by arranging the first supporting member 430 at only some periphery of the plurality of peripheries surrounding the rear surface of the plate 420. Therefore, the display apparatus 10 may not fix the vibration area of the plate 420 per partial area (or partial section), and may reduce rigidity of the sound generating module 402 by increasing degree of freedom in vibration of the plate 420. As a result, the display apparatus 10 may improve a low reproduction band by reducing a resonance frequency.

The second supporting member 450 may be between the edge of the plate 420 and the display module 100. According to an embodiment, the second supporting member 450 may be disposed at some periphery of a plurality of edges surrounding the front surface of the plate 420. For example, the second supporting member 450 may be disposed at left and right peripheries of the front surface of the plate 420 to fix or connect the left and right peripheries of the plate 420 to the display module 100 and space upper and lower peripheries of the plate 420 apart from the display module 100. Therefore, the second supporting member 450 may be disposed at some periphery of the plurality of peripheries of the front surface of the plate 420 to prevent a sealing space from being formed between the plate 420 and the display module 100.

For example, if a specific member is disposed between the plurality of edges surrounding the front surface of the plate 420 and the display module 100 and thus a sealing space is formed between the plate 420 and the display module 100, an area of the plate 420 that performs a function of a vibration plate may be restricted or limited. If the specific member surrounds at least one area of the front surface of the plate 420, the plate 420 performs the function of the vibration plate per area surrounded by the specific member, whereby the area as the vibration plate is reduced. Therefore, a vibration transfer efficiency of the plate 420 is reduced without smooth vibration, whereby a problem occurs in that a sound pressure of a sound generated from the display apparatus is reduced.

Therefore, the display apparatus 10 according to the present disclosure may fix the plate 420 to the display module 100 even without restricting the vibration area of the plate 420 by arranging the second supporting member 450 at only some periphery of the plurality of peripheries surrounding the front surface of the plate 420. Therefore, the display apparatus 10 may not fix or connect the vibration area of the plate 420 per partial area (or partial section), and may reduce rigidity of the sound generating module 402 by increasing degree of freedom of the plate 420. The display apparatus 10 may improve a low reproduction band by reducing a resonance frequency.

According to an embodiment, the area of the plate 420 that performs the function of the vibration plate in the display apparatus 10 (display apparatus shown in FIGS. 4 and 5) comprising the sound generating module 402 according to the second embodiment of the present disclosure may be greater than the area of the plate 420 that performs the function of the vibration plate in the display apparatus 10 (display apparatus shown in FIGS. 2 and 3) comprising the sound generating module 401 according to the first embodiment of the present disclosure. For example, the left and right peripheries of the plate 420 of the sound generating module 402 according to the second embodiment may be fixed by the first and second supporting members 430 and 450. The left and right peripheries of the plate 420 of the sound generating module 401 according to the first embodiment may be fixed by the first supporting member 430, and a center portion of the plate 420 may be fixed by the first adhesive member 440. Therefore, the display apparatus 10 comprising the sound generating module 402 according to the second embodiment of the present disclosure may improve the low-pitched reproduction band by improving sound pressure characteristic at the low pitched sound range through the first and second supporting members 430 and 450.

Figure 6:
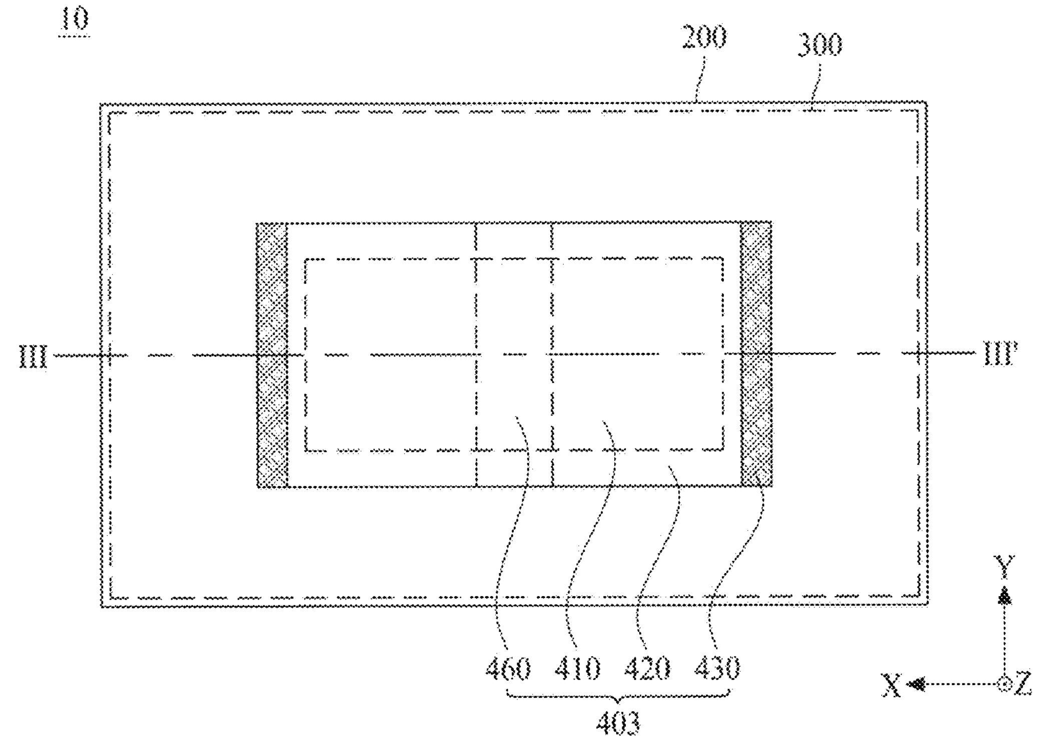
FIG. 6 is a rear view illustrating a third embodiment of a sound generating module in a display apparatus according to an embodiment of the present disclosure.
Figure 7:
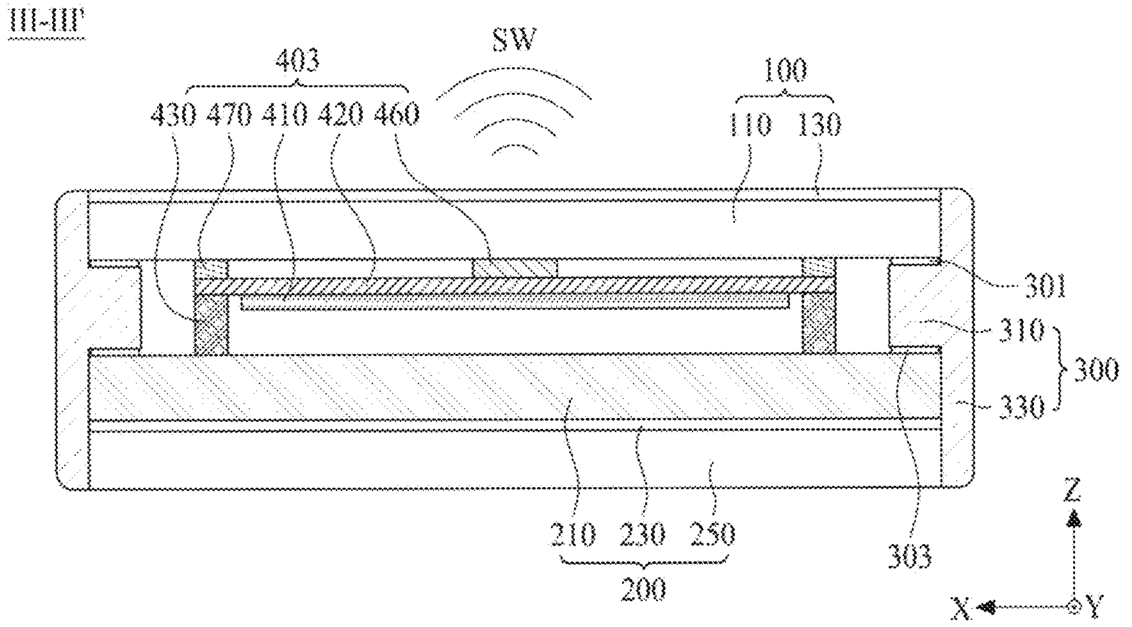
FIG. 7 is a cross-sectional view taken along line III-III' of FIG. 6.

FIG. 6 is a rear view illustrating a third embodiment of a sound generating module in a display apparatus according to an embodiment of the present disclosure, and FIG. 7 is a cross-sectional view taken along line of FIG. 6. Hereinafter, the same elements as those shown in FIGS. 2 and 3 will be described briefly or omitted.

With reference to FIGS. 6 and 7, the sound generating module 403 may include a vibration member 410, a plate 420, a first supporting member 430, a second adhesive member 460, and a third adhesive member 470. The vibration member 410 may be disposed between the plate 420 and the rear structure 200. For example, the vibration member 410 may be disposed on one surface of the plate 420 facing the rear structure 200, and may be spaced apart from the front surface of the rear structure 200. The vibration member 410 may be disposed on the rear surface of the plate 420 to vibrate the plate 420. The vibration member 410 may be vibrated in a single body with the plate 420, thereby transferring vibration to the display module 100.

According to an embodiment, the entire front surface of the vibration member 410 may be attached to the plate 420, whereby degree of freedom in vibration may be more increased than that the entire front surface of the vibration member 410 is attached to the display module 100. For example, if the entire front surface of the vibration member 410 is attached to the display module 100, the vibration member 410 does not need a separate supporting member but degree of freedom in vibration may be reduced, whereby a problem occurs in that a sound pressure characteristic at a low pitched sound range is deteriorated. In this respect, because the display apparatus 10 according to the present disclosure includes the plate 420 that may maintain flatness higher than that of the vibration member 410, the vibration member 410 may be vibrated in a single body with the plate 420 and spaced apart from the rear structure 200 by being supported by the first supporting member 430, whereby degree of freedom in vibration may be given. Because the vibration member 410 is attached to the display module 100 through the second adhesive member 460 and the third adhesive member 470, each of which has an area narrower than that of the vibration member 410, the vibration member 410 may be vibrated flexibly as compared with the case that the entire front surface of the vibration member 410 is attached to the display module 100. Also, the vibration member 410 may efficiently transfer vibration of a high pitched sound range to the display panel 100 through the second and third adhesive members 460 and 470 having rigidity higher than that of the first supporting member 430. Therefore, although the vibration member 410 may be spaced apart from each of the display module 100 and the rear structure 200, the entire front surface of the vibration member 410 may be attached to the rear surface of the plate 420, whereby the vibration member 410 may stably be supported by the plate 420 even without reduction of degree of freedom in vibration, and vibration transfer property of the high pitched sound range may be improved through the second and third adhesive members 460 and 470. Therefore, the display apparatus 10 according to the present disclosure may improve the low-pitched reproduction band by lowering the resonance frequency and prevent the sound pressure from being reduced at the high pitched sound range.

The plate 420 may be disposed between the display module 100 and the rear structure 200. The plate 420 may be disposed between the first supporting member 430 and the second and third adhesive member 460 and 470. The plate 420 may be disposed on the front surface of the vibration member 410, whereby vibration generated from the vibration member 410 may be transferred to the plate 420. Therefore, the plate 420 may be vibrated in a single body with the vibration member 410 to perform a function of a vibration plate.

According to an embodiment, a center portion of a front surface of the plate 420 may be in contact with the second adhesive member 460, a periphery of a front surface of the plate 420 may be in contact with the third adhesive member 470, and a periphery of a rear surface of the plate 420 may be in contact with the first supporting member 430. Therefore, the second adhesive member 460 may support the center portion of the front surface of the plate 420, the third adhesive member 470 may support the periphery of the front surface of the plate 420, and the first supporting member 430 may support the periphery of the rear surface of the plate 420. Therefore, the second and third adhesive members 460 and 470 may fix or connect the plate 420 to the display module 100, and the first supporting member 430 may fix or connect the plate 420 to the rear structure 200. Therefore, the plate 420 may be fixed between the display module 100 and the rear structure 200 through the first supporting member 430 and the second and third adhesive members 460 and 470.

According to an embodiment, the plate 420 may include a material having high rigidity, thereby improving vibration transfer property of the sound generating module 403. For example, the plate 420 may be a metal having excellent vibration transfer property, such as aluminum (Al), copper (Cu), and stainless steel, or a reinforced plastic compound. The rear surface of the plate 420 may be attached to the entire front surface of the vibration member 410 and thus vibrated in a single body with the vibration member 410.

The first supporting member 430 may be interposed between the periphery of the plate 420 and the rear structure 200. According to an embodiment, the first supporting member 430 may be disposed at some periphery of a plurality of peripheries surrounding the rear surface of the plate 420. For example, the first supporting member 430 may be disposed at left and right peripheries of the rear surface of the plate 420 to fix the left and right peripheries of the plate 420 to the rear structure 200 and space upper and lower peripheries of the plate 420 apart from the rear structure 200. Therefore, the first supporting member 430 may be disposed at some periphery of the plurality of peripheries of the rear surface of the plate 420 to prevent a sealing space from being formed between the plate 420 and the rear structure 200.

For example, if a specific member is disposed between the plurality of peripheries surrounding the rear surface of the plate 420 and the rear structure 200, and thus, a sealing space is formed between the plate 420 and the rear structure 200, an area of the plate 420 that performs a function of a vibration plate may be restricted or limited. If the specific member surrounds at least one area of the rear surface of the plate 420, the plate 420 performs the function of the vibration plate per area surrounded by the specific member, whereby the area as the vibration plate is reduced. Therefore, a vibration transfer efficiency of the plate 420 is reduced without smooth vibration, whereby a problem occurs in that a sound pressure of a sound generated from the display apparatus is reduced.

Therefore, the display apparatus 10 according to the present disclosure may fix the plate 420 to the rear structure 200 even without restricting the vibration area of the plate 420 by arranging the first supporting member 430 at only some periphery of the plurality of peripheries surrounding the rear surface of the plate 420. Therefore, the display apparatus 10 may not fix the vibration area of the plate 420 per partial area (or partial section), and may reduce rigidity of the sound generating module 403 by increasing degree of freedom in vibration of the plate 420. As a result, the display apparatus 10 may improve a low reproduction band by reducing a resonance frequency.

According to an embodiment, rigidity of the first supporting member 430 may be lower than that of each of the second and third adhesive members 460 and 470. Also, the first supporting member 430 may include a material having high elasticity. For example, the first supporting member 430 may be, but is not limited thereto, silicon. Therefore, the first supporting member 430 may fix the plate 420 to the rear structure 200 and at the same time increase elasticity (or elasticity of vibration of the plate 420) of the plate 420 if the plate 420 is vibrated. Therefore, rigidity of the first supporting member 430 may be lower than that of each of the second third adhesive members 460 and 470, whereby rigidity of the sound generating module 403 coupled (or fixed or connected) to the front surface of the rear structure 200 may be reduced, and the resonance frequency of the display apparatus 10 may be reduced.

The second adhesive member 460 may be between the rear surface of the display panel 110 and the center portion of the front surface of the plate 420. The third adhesive member 470 may be interposed between the rear surface of the display panel 110 and the periphery of the front surface of the plate 420. The second and third adhesive members

460 and 470 may vibrate the display panel 110 by transferring vibration of the plate 420 to the display panel 110. According to an embodiment, the second and third adhesive members 460 and 470 may be, but is not limited thereto, a double-sided tape or adhesive, which includes an adhesive layer having excellent adhesion with each of the rear surface of the display panel 110 and plate 420. For example, each adhesive layer of the second and third adhesive members 460 and 470 may include, but is not limited thereto, epoxy, acryl, silicon or urethane. The adhesive layer of the second and third adhesive members 460 and 470 may further include an additive, such as a tackifier or an adhesiveness enhancing agent, a wax ingredient, or an anti-oxidizer, which prevents the second and third adhesive members 460 and 470 from being detached (or separated) from the display panel 110 by vibration of the plate 420. For example, the tackifier may be, but is not limited thereto, a rosin derive, the wax ingredient may be, but not limited to, Paraffin Wax, etc., and the anti-oxidizer may be, but not limited to, a phenolic anti-oxidizer such as thiolester.

The second adhesive member 460 may be disposed at a center portion of a front surface (or a center area of a front surface) of the plate 420. For example, the third adhesive member 470 may be disposed at the periphery of the front surface of the plate 420. For example, the third adhesive member 470 may be disposed at left and right peripheries of the front surface of the plate 420, and the second adhesive member 460 may be disposed at the center portion of the front surface in parallel with the third adhesive member 470. According to an embodiment, among the front surface of the plate 420, an attachment area or an arrangement area of the plate 420 with the first and second adhesive members 460 and 470 may be smaller than an attachment area or an arrangement area of the plate 420, which is not attached with the second and third adhesive members 460 and 470. Among the front surface of the plate 420, the area of the plate 420, which is not attached with the second and third adhesive members 460 and 470 may be spaced apart from the display panel 110 as much as the thickness of the second and third adhesive members 460 and 470. Therefore, the second and third adhesive members 460 and 470 may increase degree of freedom in vibration of the plate 420 to reduce rigidity of the sound generating module 403 by fixing a portion of the front surface of the plate 420 to the rear surface of the display panel 110 and spacing the other portion of the front surface of the plate 420 apart from the rear surface of the display panel 110. Rigidity of the sound generating module 403 may be rigidity of the sound generating module 403 coupled or connected to the rear surface of the display panel 110. Therefore, as the second and third adhesive members 460 and 470 may be disposed at the center portion of the front surface and the periphery of the front surface of the plate 420, rigidity of the sound generating module 403 may be more reduced than that the entire front surface of the plate 420 is attached to the rear surface of the display panel 110, and the resonance frequency of the display apparatus 10 may be lowered to improve a low-pitched reproduction band.

According to an embodiment, the third adhesive member 470 may be overlapped with the first supporting member 430. For example, the first supporting member 430 may be disposed at the left and right peripheries of the rear surface of the plate 420, and the third adhesive member 470 may be disposed at the left and right peripheries of the periphery of the front surface of the plate 420. Therefore, the first supporting member 430 and the third adhesive member 470 may fix the left and right peripheries of the plate 420 to the rear structure 200 and the display module 100, and the other area of the plate 420, which is not fixed to the first supporting member 430 and the third adhesive member 470, may freely be vibrated. Therefore, the first supporting member 430 and the third adhesive member 470 may support and fix the plate 420 at each periphery of the front and rear surfaces of the plate 420 to maximize (or at least increase) the area of the plate 420, which performs the function of the vibration plate, and increase degree of freedom in vibration of the plate 420. Also, the third adhesive member 470 has rigidity higher than that of the first supporting member 430, thereby improving vibration transfer property of a high pitched sound range transferred from the plate 420 to the display module 100. Therefore, the display apparatus 10 may reduce its resonance frequency by reducing rigidity of the sound generating module 403, whereby a low-pitched reproduction band may be improved and a sound pressure may be prevented from being reduced at the high pitched sound range.

Generally, a film type piezoelectric body or a piezoelectric composite body may be one structure body formed of piezoelectric ceramic. If the film type piezoelectric body is applied to the display apparatus, the entire front surface of the film type piezoelectric body may be attached to the rear surface of the display panel. Therefore, the film type piezoelectric body may be vibrated smoothly in a horizontal direction but cannot be vibrated sufficiently in a vertical direction (or forward-backward direction), whereby degree of freedom in vibration of the film type piezoelectric body may be restricted. Therefore, the display apparatus cannot output a sound having a desired sound pressure to a front direction of the display panel, whereby a problem occurs in that sound pressure characteristic at a low pitched sound range is deteriorated.

Therefore, the display apparatus 10 according to the present disclosure may increase a sound pressure of a high pitched sound range by transferring vibration of the plate 420 to the display panel 110 through the second and third adhesive members 460 and 470 having relatively high rigidity. The display apparatus 10 may increase degree of freedom in vibration of the vibration member 410 and the plate 420 and reduce rigidity of the sound generating module 403 coupled to the display module 100 and the rear structure 200 by arranging the third adhesive member 470 at the periphery of the front surface of the plate 420 and arranging the first supporting member 430 at the periphery of the rear surface of the plate 420. Therefore, the resonance frequency of the display apparatus 10 may be reduced, whereby the lowest pitched sound range, which can be output (or reproduced) by the display apparatus 10, may be reduced and thus the low-pitched reproduction band may be improved. Therefore, the display apparatus 10 comprising the sound generating module 403 according to the third embodiment may increase the sound pressure of the high pitched sound range, which is output therefrom, through the second and third adhesive members 460 and 470, and at the same time may improve flatness of the sound pressure by improving sound pressure characteristic at the low pitched sound range through the first supporting member 430. Also, because the display apparatus 10 comprising the sound generating module 403 according to the third embodiment further comprises the second and third adhesive members 460 and 470, it may improve vibration transfer property at the high pitched sound range as compared with the display apparatus 10 according to the first embodiment, which comprises the first adhesive member 440 only.

Figure 8:
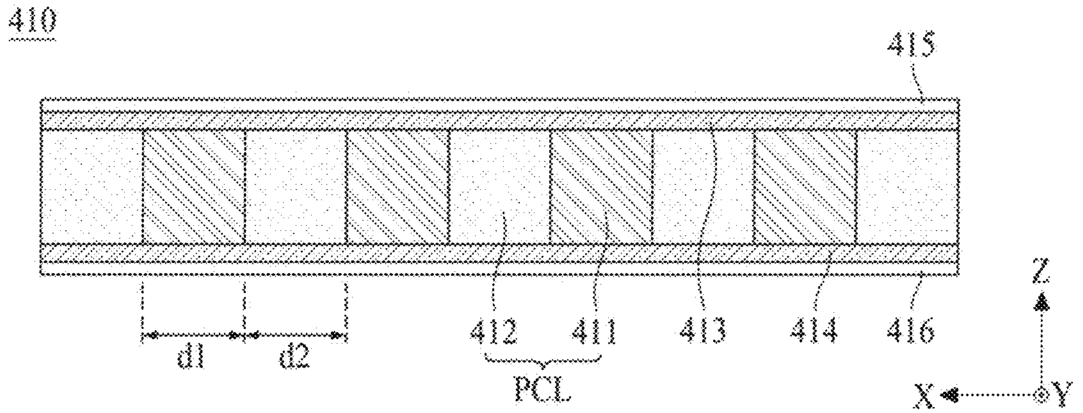
FIG. 8 is a cross-sectional view illustrating a vibration member of a display apparatus according to an embodiment of the present disclosure.
Figure 9:
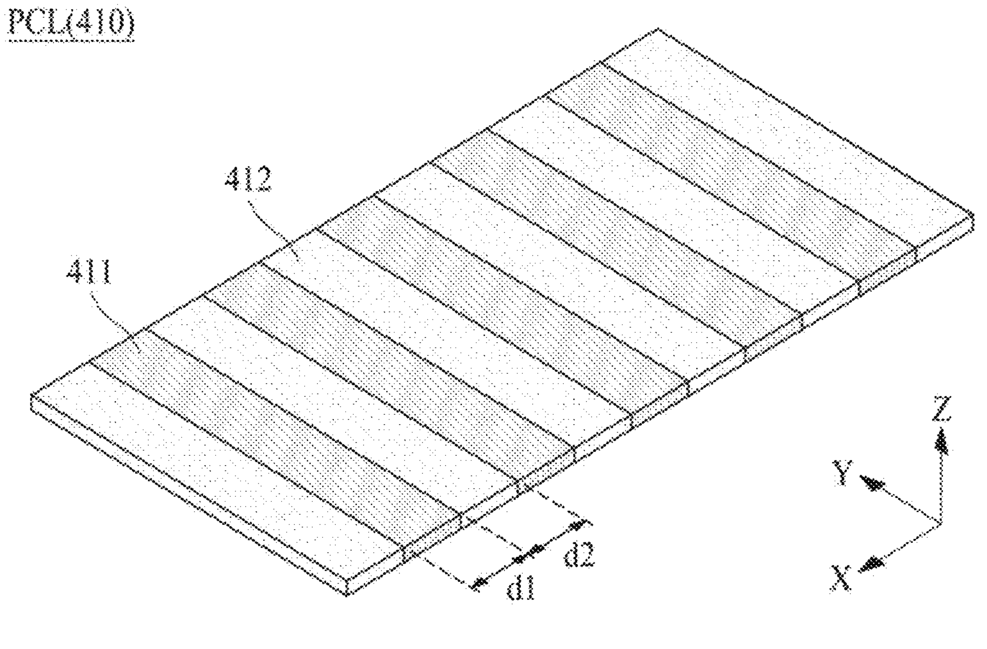
FIG. 9 illustrates a piezoelectric composite layer of a vibration member of FIG. 8.

FIG. 8 is a cross-sectional view illustrating a vibration member of a display apparatus according to an embodiment of the present disclosure, and FIG. 9 illustrates a piezoelectric composite layer of a vibration member of FIG. 8.

With reference to FIGS. 8 and 9, because the vibration member 410 has flexibility, the vibration member 410 may be vibrated by being bent by an electric signal. For example, the vibration member 410 may be vibrated in accordance with a voice signal synchronized with an image displayed on the display panel 110 to vibrate the display panel 110 or the plate 420. For another embodiment, the vibration member 410 may be vibrated in accordance with a haptic feedback signal (or tactile feedback signal) synchronized with a user touch for a touch panel (or touch sensor layer) disposed on or built in the display panel 110, to vibrate the display panel 110. Therefore, the display panel 110 may be vibrated in accordance with vibration of the vibration member 410 to provide at least one of sound and haptic feedback to a user (or viewer). The vibration member 410 may include a piezoelectric composite layer PCL, a first electrode layer 413 and a second electrode layer 414.

The piezoelectric composite layer PCL may include a plurality of first portions 411 and a plurality of second portions 412. According to an embodiment, each of the plurality of first portions 411 may be a line pattern having a first predetermined length d1 (or interval or distance), and may be spaced apart from anther first portion to have a second predetermined length d2 (or interval or distance) along a first direction X and disposed in parallel with a second direction Y crossing the first direction X. The plurality of first portions 411 may have the same size, for example, the same width, area or volume, within a process error (or allowable error or tolerance) generated in a manufacturing process.

According to an embodiment, each of the plurality of first portions 411 may include an inorganic material or piezoelectric material vibrated by a piezoelectric effect (or piezoelectric property) according to an electric field. For example, each of the plurality of first portions 411 may be expressed as, but not limited to, an electro active portion, an inorganic material portion, a piezoelectric material portion, or a vibration portion.

According to an embodiment, each of the plurality of first portions 411 may include an electroactive material. The electroactive material is characterized in that pressure or distortion acts on a crystalline structure by an external force and thus a potential difference occurs by means of dielectric polarization according to a relative position change of positive (+) ions and negative (−) ions, whereas vibration occurs by means of an electric field according to a voltage that is applied.

For example, the inorganic material portion in each of the plurality of first portions 411 may include, but is not limited to, one or more of Pb, Zr, Ti, Zn, Mn, Ni and Nb. For another example, the inorganic material portion in each of the plurality of first portions 411 may include, but is not limited thereto, a PZT (lead zirconate titanate) base material including Pb, Zr and Ti, or a PZNN (lead zirconate nickel niobate) based material including Pb, Zn, Ni, and Nb. Also, the inorganic material portion may include, but is not limited thereto, at least one of $CaTiO_3$, $BaTiO_3$, and $SrTiO_3$, which do not include Pb.

Each of the plurality of second portions 412 may be disposed between the plurality of first portions 411. The plurality of first portions 411 and the plurality of second portions 412 may respectively be disposed on the same plane (or same layer) in parallel. Each of the plurality of second portions 412 may be disposed to fill a gap between two of the first portions 411 adjacent to each other, and thus may be connected with or adhered to the first portions 411 adjacent thereto. For example, the plurality of second portions 412 may be a line pattern having a second predetermined length d2, and may be disposed in parallel by interposing the first portion 411 therebetween. Each of the plurality of second portions 412 may have the same size, for example, the same width, area or volume, within a process error (or allowable error or tolerance) generated in a manufacturing process.

As the inorganic material portion (the first portion) and the organic material portion (the second portion) of the vibration member 410 of the display apparatus 10 according to the present disclosure are disposed on the same layer, external impact of the display apparatus may be absorbed by the organic material portion, whereby a damage of the inorganic material portion and vibration performance deterioration (or sound performance deterioration) caused by the damage may be minimized or prevented.

The second portions 412 may be equal to or different from the first portions 411. A size of each of the first portions 411 and the second portions 412 may be adjusted in accordance with requirements such as vibration property and/or flexibility of the vibration member 410.

The organic material portion contained in each of the plurality of second portions 412 may be comprised of an organic material or organic polymer having flexible property as compared with the inorganic material portion, which is the first portion 411. For example, each of the plurality of second portions 412 may include an organic material, an organic polymer, an organic piezoelectric material, or an organic non-piezoelectric material. For example, each of the plurality of second portions 412 may be expressed as, but is not limited thereto, an adhesive portion, an elastic portion, a bending portion, a damping portion or a flexible portion. The organic material portions may be disposed between the respective inorganic material portions to absorb impact applied to the inorganic material portion (or the first portion), and may improve durability of the vibration member 410 by releasing stress concentrated on the inorganic material portion. Also, flexibility may be provided to the vibration member 410.

As the first portions 411 formed of the inorganic material, having piezoelectric property and the second portions 412 formed of the organic material, having flexibility may alternately repeatedly be connected with each other, the piezoelectric composite layer PCL may have a thin film shape, and may have a size corresponding to the display panel 110 of the display apparatus or a size that can implement vibration property or sound pressure characteristic be adjusted by the display panel 100.

According to an embodiment, each of the plurality of first portions 411 may be formed of a ceramic based material that can implement relatively high vibration or piezoelectric ceramic having a Perovskite crystalline structure. The Perovskite crystalline structure may have piezoelectric and inverse piezoelectric effects, and may be a plate shaped structure having alignment. Therefore, the vibration member 410 of the display apparatus 10 according to the present disclosure may be vibrated (or mechanical displacement) in response to an externally applied electric signal. For example, if an alternating current voltage is applied to the inorganic material portion (the first portion), the vibration member 410 may be vibrated by means of bending of which direction is changed alternately as the inorganic material portion is repeatedly contracted and expanded by an inverse piezoelectric effect. The display panel 110 may be vibrated by such vibration of the vibration member, whereby a sound or haptic feedback may be provided to a user.

According to an embodiment, the vibration member 410 according to the present disclosure may be implemented in a pattern shape of the organic material portion and the inorganic material portion, whereby the area (or size) of the vibration member 410 may be enlarged infinitely. For this reason, panel coverage of the vibration member 410 for the display panel 110 may be increased, whereby sound pressure characteristic according to vibration of the display panel 110 may be improved. Also, because the vibration member 410 may have a slim size, increase of power consumption may be reduced or prevented. Also, because the vibration member 410 according to the present disclosure may be implemented in a thin film shape including the inorganic material portion and the organic material portion, the vibration member 410 may be provided in the display apparatus in a single body without interference with the other parts and/or mechanism constituting the display apparatus.

The piezoelectric composite layer PCL may be polarized by a certain voltage applied to the first electrode layer 413 and the second electrode layer 414 in the atmosphere of a certain temperature. The first electrode layer 413 may be disposed on a first surface (or front surface) of the piezoelectric composite layer PCL and electrically connected with the first surface of each of the plurality of first portions 411. According to an embodiment, the first electrode layer 413 may be formed of a transparent conductive material, a semi-transparent conductive material, or an opaque conductive material. For example, the transparent or semi-transparent conductive material may include, but is not limited thereto, indium tin oxide (ITO) or indium zinc oxide (IZO). The opaque conductive material may include, but is not limited thereto, aluminum (Al), copper (Cu), gold (Au), silver (Ag), molybdenum (Mo), or magnesium (Mg), or their alloy.

The second electrode layer 414 may be disposed on a second surface (or rear surface) opposite to the first surface of the piezoelectric composite layer PCL and electrically connected with the second surface of each of the plurality of first portions 411. According to an embodiment, the second electrode layer 414 may be formed of a transparent conductive material, a semi-transparent conductive material, or an opaque conductive material. For example, the second electrode layer 414 may be formed of, but is not limited thereto, the same material as that of the first electrode layer 413.

The vibration member 410 may include a first protective film 415 and a second protective film 416. The first protective film 415 may be disposed on the first electrode layer 413 and protect the first surface of the piezoelectric composite layer PCL or the first electrode layer 413. For example, the first protective film 415 may be, but is not limited thereto, a polyimide (PI) film or polyethyleneterephthalate (PET) film.

The second protective film 416 may be disposed on the second electrode layer 414 and protect the second surface of the piezoelectric composite layer PCL or the second electrode layer 414. For example, the second protective film 416 may be, but is not limited thereto, a polyimide (PI) film or polyethyleneterephthalate (PET) film.

Figure 10:
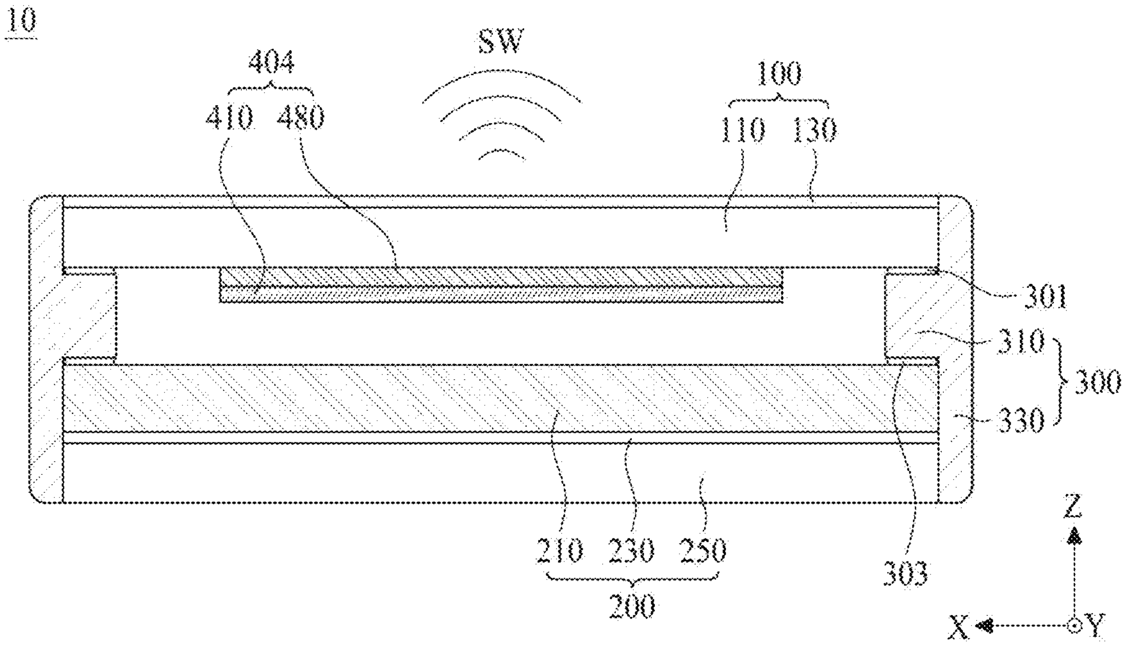
FIG. 10 is a cross-sectional view illustrating a fourth embodiment of a sound generating module in a display apparatus according to an embodiment of the present disclosure.

FIG. 10 is a cross-sectional view illustrating a fourth embodiment of a sound generating module in a display apparatus according to an embodiment of the present disclosure. Hereinafter, the same elements as those shown in FIGS. 2 to 7 will be described briefly or omitted.

With reference to FIG. 10, the sound generating module 404 may include a vibration member 410, and a fourth adhesive member 480. A front surface of the vibration member 410 may be attached to a rear surface of the display panel 100 using the fourth adhesive member 480. Therefore, the vibration member 410 may transfer vibration to the display panel 110 through the fourth adhesive member 480. A rear surface of the vibration member 410 may be spaced apart from the rear structure 200.

According to an embodiment, the fourth adhesive member 480 may be disposed on the entire front surface of the vibration member 410 to transfer vibration of the vibration member 410 to the display module 100. According to an embodiment, the fourth adhesive member 480 may be a double-sided tape or adhesive, which includes an adhesive layer having excellent adhesion with each of the rear surface of the display panel 110 and the front surface of the vibration member 410. For example, the adhesive layer of the fourth adhesive member 480 may include, but is not limited thereto, epoxy, acryl, silicon or urethane.

Figure 11:
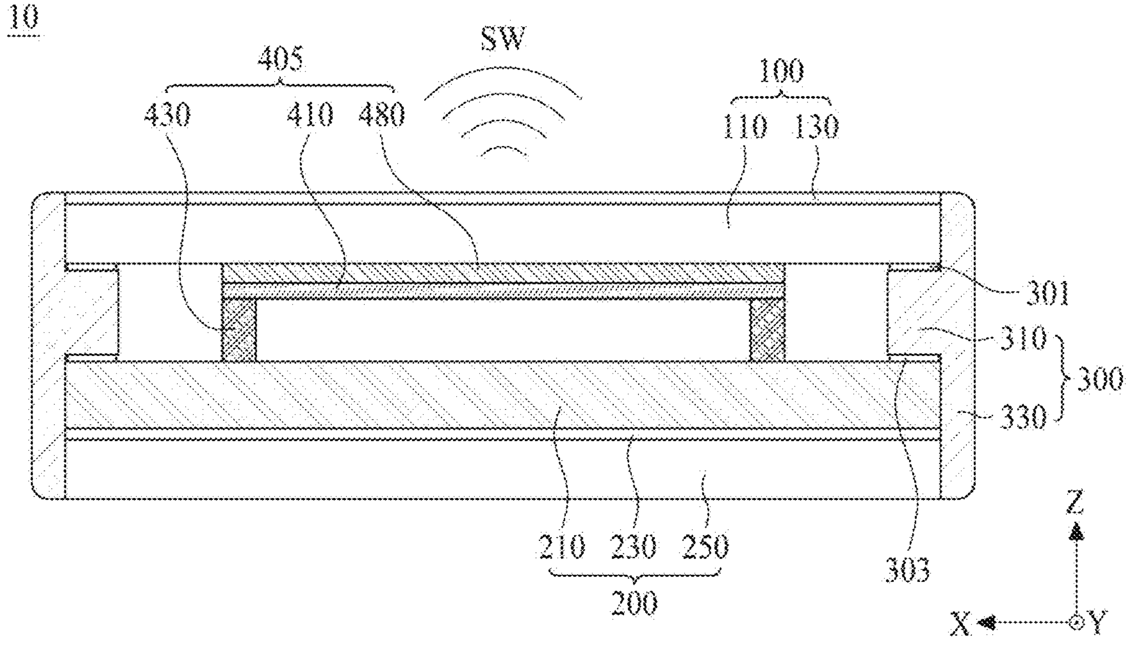
FIG. 11 is a cross-sectional view illustrating a fifth embodiment of a sound generating module in a display apparatus according to an embodiment of the present disclosure.

FIG. 11 is a cross-sectional view illustrating a fifth embodiment of a sound generating module in a display apparatus according to an embodiment of the present disclosure. Hereinafter, the same elements as those shown in FIGS. 2 to 7 and FIG. 10 will be described briefly or omitted.

With reference to FIG. 11, the sound generating module 405 may include a vibration member 410, a first supporting member 430 and a fourth adhesive member 480.

A front surface of the vibration member 410 may be attached to a rear surface of the display panel 100 using of the fourth adhesive member 480. Therefore, the vibration member 410 may transfer vibration to the display panel 110 through the fourth adhesive member 480. A periphery of a rear surface of the vibration member 410 may be in contact with the first supporting member 430.

The first supporting member 430 may be between the periphery of the vibration member 410 and the rear structure 200. For example, the first supporting member 430 may be disposed at left and right peripheries of the rear surface of the vibration member 410 to fix the left and right peripheries of the vibration member 410 to the rear structure 200.

According to an embodiment, the fourth adhesive member 480 may be disposed on the entire front surface of the vibration member 410 to transfer vibration of the vibration member 410 to the display module 100. According to an embodiment, the fourth adhesive member 480 may be a double-sided tape or adhesive, which includes an adhesive layer having excellent adhesion with each of the rear surface of the display panel 110 and the front surface of the vibration member 410. For example, the adhesive layer of the fourth adhesive member 480 may include, but is not limited thereto, epoxy, acryl, silicon or urethane.

Figure 12:
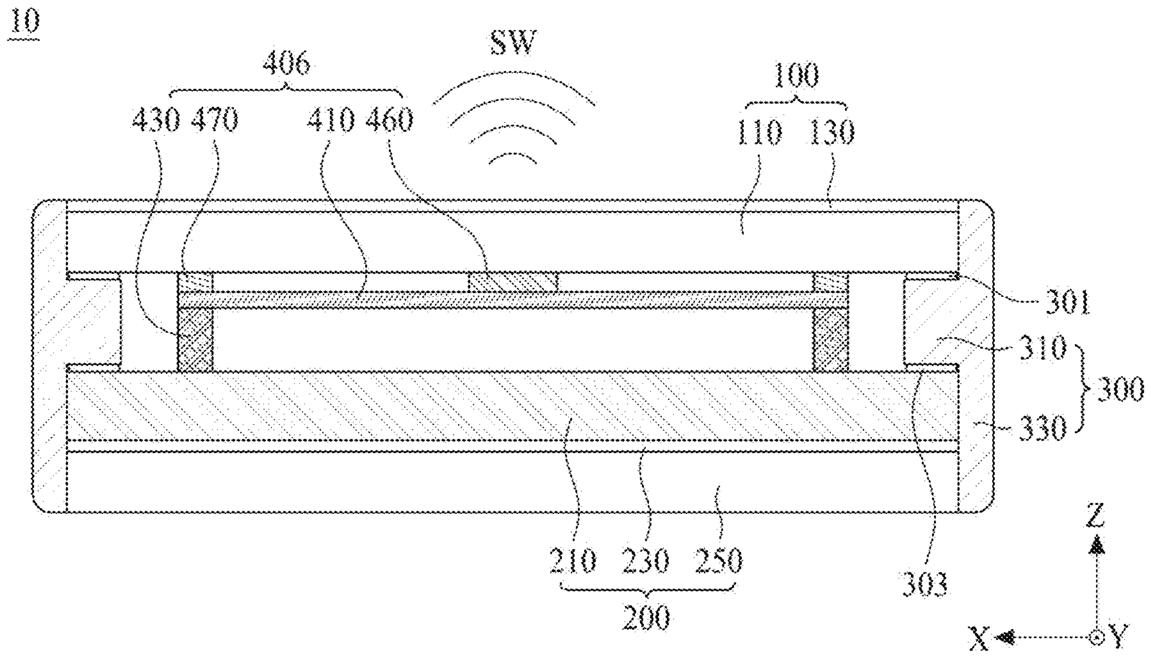
FIG. 12 is a cross-sectional view illustrating a sixth embodiment of a sound generating module in a display apparatus according to an embodiment of the present disclosure.

FIG. 12 is a cross-sectional view illustrating a sixth embodiment of a sound generating module in a display apparatus according to an embodiment of the present disclosure. Hereinafter, the same elements as those shown in FIGS. 2 to 7, FIG. 10 and FIG. 11 will be described briefly or omitted.

With reference to FIG. 12, the sound generating module 406 may include a vibration member 410, a first supporting member 430, and second and third adhesive members 460 and 470.

A front surface of the vibration member 410 may be attached to a rear surface of the display panel 100 by means of the second and third adhesive member 460 and 47. Therefore, the vibration member 410 may transfer vibration to the display panel 110 through the second and third adhesive members 460 and 470. A periphery of a rear surface of the vibration member 410 may be in contact with the first supporting member 430.

A center portion of the front surface of the vibration member 410 may be in contact with the second adhesive member 460, a periphery of a front surface of the vibration member 410 may be in contact with the third adhesive member 470, and a periphery of a rear surface of the vibration member 410 may be in contact with the first supporting member 430. Therefore, the second and third adhesive members 460 and 470 may fix the vibration member 410 to the display module 100, and the first supporting member 430 may fix the vibration member 410 to the rear structure 200. Therefore, the vibration member 410 may be fixed between the display module 100 and the rear structure 200 through the second and third adhesive members 460 and 470.

The first supporting member 430 may be between the periphery of the vibration member 410 and the rear structure 200. For example, the first supporting member 430 may be disposed at left and right peripheries of the rear surface of the vibration member 410 to fix the left and right peripheries of the vibration member 410 to the rear structure 200.

According to an embodiment, the second and third adhesive members 460 and 470 transfer vibration of the vibration member 410 to the display module 100. According to an embodiment, each of the second and third adhesive members 460 and 470 may be a double-sided tape or adhesive, which includes an adhesive layer having excellent adhesion with each of the display panel 110 and the vibration member 410. For example, the adhesive layer of the second and third adhesive members 460 and 470 may include, but is not limited thereto, epoxy, acryl, silicon or urethane.

Figure 13:
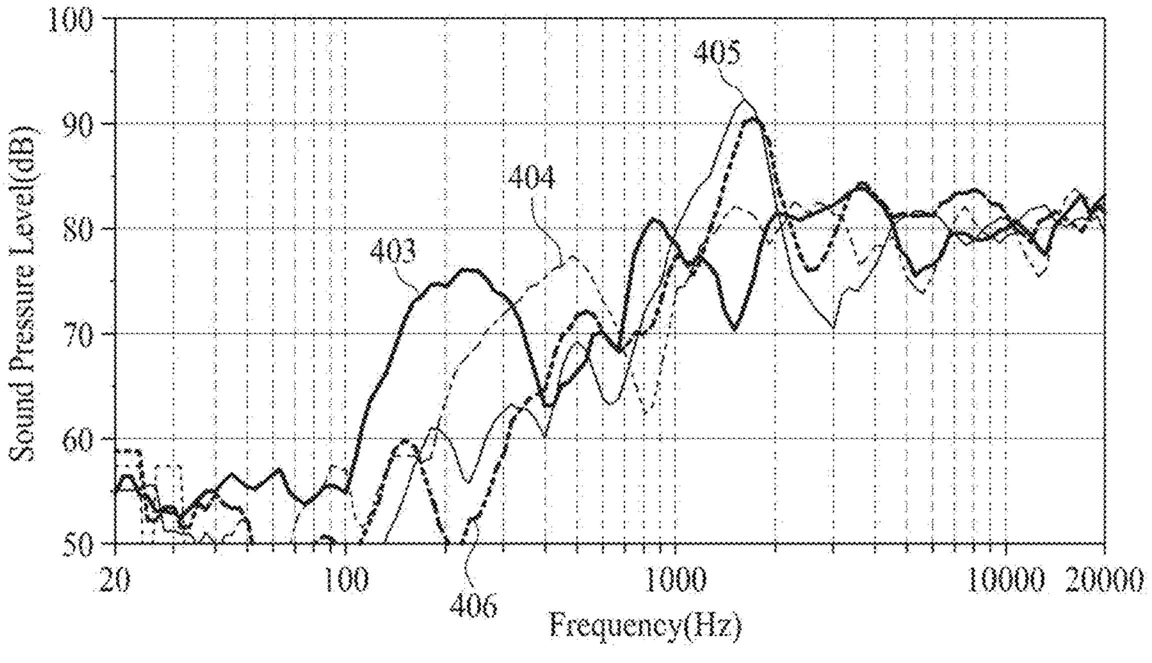
FIG. 13 is a graph illustrating a sound pressure level of a display apparatus according to third to sixth embodiments of a sound generating module in a display apparatus according to an embodiment of the present disclosure.

FIG. 13 is a graph illustrating a sound pressure level of a display apparatus according to third to sixth embodiments of a sound generating module in a display apparatus according to an embodiment of the present disclosure.

As described above, the sound generating module 403 in FIG. 7 of the third embodiment may include a vibration member 410, a plate 420, a first supporting member 430, a second adhesive member 460, and a third adhesive member 470, and the sound generating module 404 of the fourth embodiment may include a vibration member 410 and a fourth adhesive member 480. The sound generating module 405 of the fifth embodiment may include a vibration member 410, a first supporting member 430, and a fourth adhesive member 480, and the sound generating module 406 of the sixth embodiment may include a vibration member 410, a first supporting member 430, and second and third adhesive members 460 and 470.

With reference to FIG. 13, the display apparatus 10 comprising the sound generating module 403 according to the third embodiment may increase a sound pressure of a high pitched sound range by transferring vibration of the plate 420 to the display panel 110 through the second and third adhesive members 460 and 470 having relatively high rigidity. The display apparatus 10 comprising the sound generating module 403 according to the third embodiment may increase degree of freedom in vibration of the vibration member 410 and the plate 420 and reduce rigidity of the sound generating module 403 coupled or connected to the display module 100 and the rear structure 200 by arranging the third adhesive member 470 at the periphery of the front surface of the plate 420 and arranging the first supporting member 430 at the periphery of the rear surface of the plate 420. Therefore, the resonance frequency of the display apparatus 10 may be reduced, whereby the lowest pitched sound range, which can be output (or reproduced) by the display apparatus 10, may be reduced and thus the low-pitched reproduction band may be improved.

Because the entire front surface of the vibration member 410 is attached to the display module 100 through the fourth adhesive member 480 in the sound generating module 404 in FIG. 10 according to the fourth embodiment, the vibration member 410 does not need a separate supporting member but degree of freedom in vibration may be reduced. Thus, sound pressure characteristics at a low pitched sound range is deteriorated as compared to the sound generating module 403 in FIG. 7 of the third embodiment. Therefore, in the display apparatus 10 comprising the sound generating module 403 according to the third embodiment, the lowest pitched sound range that can be output may be reduced to a lower frequency as compared to the display apparatus 10 comprising the sound generating module 404 according to the fourth embodiment. Thus, the low-pitched reproduction band may be improved using the sound generating module 403 in FIG. 7 of the third embodiment. For example, it is shown the display apparatus 10 comprising the sound generating module 403 according to the third embodiment that a sound pressure at a low pitched sound range of 200 Hz is increased as much as 15 dB, approximately, as compared with the display apparatus 10 comprising the sound generating module 404 according to the fourth embodiment.

Because the entire front surface of the vibration member 410 is attached to the display module 100 through the fourth adhesive member 480 and the periphery of the rear surface of the vibration member 410 is attached to the first supporting member 430 in the sound generating module 405 in FIG. 11 according to the fifth embodiment, rigidity of the sound generating module 405 may be increased. Therefore, in the sound generating module 405 according to the fifth embodiment, rigidity of the sound generating module 405 coupled or connected to the display module 100 and the rear structure 200 may be increased to increase the resonance frequency. Thus, the low-pitched reproduction band is deteriorated as compared to the sound generating module 403 in FIG. 7 of the third embodiment. Also, among the sound generating modules 403, 404, 405, and 406 of the third to sixth embodiments, because the sound generating module 405 according to the fifth embodiment has the highest rigidity, its resonance frequency is increased the highest. Therefore, in the display apparatus comprising the sound generating module 403 according to the third embodiment, the lowest pitched sound range that can be output may be reduced to a lower frequency as compared to the display apparatus 10 comprising the sound generating module 405 according to the fifth embodiment. Thus, the low-pitched reproduction band may be improved using the sound generating module 403 in FIG. 7 of the third embodiment. For example, it is shown the display apparatus 10 comprising the sound generating module 403 according to the third embodiment that a sound pressure at a low pitched sound range of 200 Hz is increased as much as 25 dB, approximately, as compared with the display apparatus 10 comprising the sound generating module 405 according to the fifth embodiment.

Because the front surface of the vibration member 410 is attached to the display module 100 through the second and third adhesive members 460 and 470 and the periphery of the rear surface of the vibration member 410 is attached to the first supporting member 430 in the sound generating module 406 in FIG. 12 according to the sixth embodiment, rigidity of the sound generating module 406 may be increased and a resonance point may be increased. Therefore, in the sound generating module 406 according to the sixth embodiment, rigidity of the sound generating module 406 coupled or connected to the display module 100 and the rear structure 200 may be increased to increase the resonance frequency. Thus, the low-pitched reproduction band is deteriorated as compared to that of the sound generating module 403 in FIG. 7 of the third embodiment. Therefore, in the display apparatus comprising the sound generating module 403 according to the third embodiment, the lowest pitched sound range that can be output may be more reduced to a lower frequency as compared to the display apparatus 10 comprising the sound generating module 406 according to the sixth embodiment. Thus, the low-pitched reproduction band may be improved using the sound generating module 403 in FIG. 7 of the third embodiment. For example, it is noted from the display apparatus 10 comprising the sound generating module 403 according to the third embodiment that a sound pressure at a low pitched sound range of 200 Hz is increased as much as 25 dB, approximately, as compared with the display apparatus 10 comprising the sound generating module 406 according to the sixth embodiment. For example, it is noted from the display apparatus 10 comprising the sound generating module 403 according to the third embodiment that a sound pressure at a low pitched sound range of 400 Hz is increased as much as 75 dB, approximately, as compared with the display apparatus 10 comprising the sound generating module 406 according to the sixth embodiment.

Therefore, in the display apparatus 10 comprising the sound generating module 403 according to the third embodiment, because the vibration member 410 is attached to the rear surface of the plate 420, rigidity of the vibration member 410 and the plate 420 coupled to the display module 100 and the rear structure 200 may be reduced, and a mass of the sound generating module 403 may be increased to minimize the resonance frequency of the sound generating module 403. Also, the display apparatus 10 comprising the sound generating module 403 according to the third embodiment may increase a sound pressure of a high pitched sound range output from the display apparatus 10 through the second and third adhesive members 460 and 470 and at the same time improve sound pressure characteristic at a low pitched sound range through the first supporting member 430.

Therefore, the sound generating module 403 according to the third embodiment may further improve sound output characteristic at the low pitched sound range and flatness of the sound pressure than the sound generating modules 404, 405, and 406 of the fourth to sixth embodiments.

Figure 14:
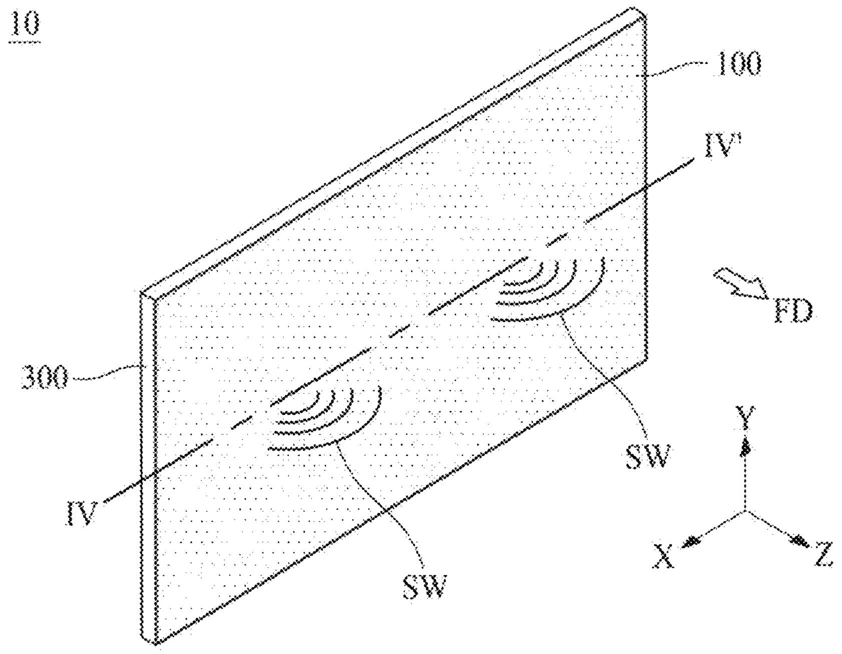
FIG. 14 is a perspective view illustrating a display apparatus according to another embodiment of the present disclosure.
Figure 15:
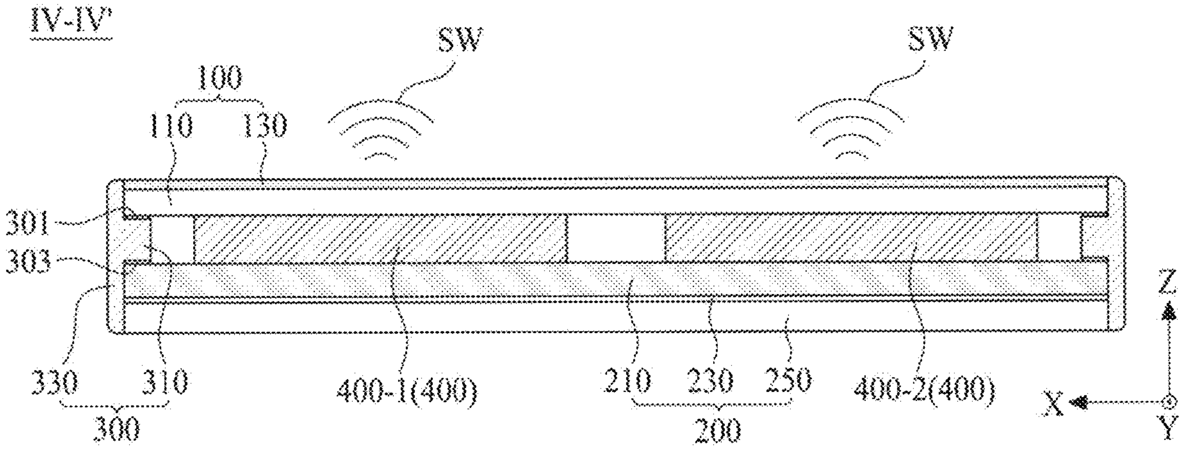
FIG. 15 is a cross-sectional view taken along line IV-IV' of FIG. 14.

FIG. 14 is a perspective view illustrating a display apparatus according to another embodiment of the present disclosure, and FIG. 15 is a cross-sectional view taken along line IV-IV' of FIG. 14.

With reference to FIGS. 14 and 15, the display apparatus 10 according to another embodiment of the present disclosure may comprise a plurality of sound generating modules 400. For example, the display apparatus 10 may include first and second sound generating modules 400-1 and 400-2, and the first and second sound generating modules 400-1 and 400-2 may be implemented as the sound generating modules 401, 402, and 403 according to the first to third embodiments.

According to an embodiment, the first and second sound generating modules 400-1 and 400-2 may include a first sound generating module 400-1 in a first area (or left area) of the display module 100, and a second sound generating module 400-2 in a second area (or right area) of the display module 100, based on a rear surface center of the display module 100. For example, the first sound generating module 400-1 may generate a sound SW according to vibration of the first area of the display module 100 by vibrating a first rear surface area of the display module 100. The second sound generating module 400-2 may generate a sound SW according to vibration of the second area of the display module 100 by vibrating a second rear surface area of the display module 100. Therefore, the display apparatus 10 may comprise the first and second sound generating modules 400-1 and 400-2 in left and right areas of the rear surface of the display module 100, thereby outputting two-channel type stereo sounds based on left and right sound split. The first sound generating module 400-1 may output a left sound, and the second sound generating module 400-2 may output a right sound.

The display apparatus according to the embodiment of the present disclosure may be applied to a mobile apparatus, a video phone, a smart watch, a watch phone, a wearable apparatus, a foldable apparatus, a rollable apparatus, a bendable apparatus, a flexible apparatus, a transparent display apparatus, a curved device, an electronic diary, an electronic book, a PMP (portable multimedia player), a PDA (personal digital assistant), MP3 player, a mobile medical apparatus, a desktop PC, a laptop PC, a netbook computer, a portable computer, a workstation, a navigator, a vehicle navigator, a television, a television, a wall paper, a signage apparatus, a game apparatus, a lamp apparatus, a notebook computer, a monitor, a camera, a camcorder, and home appliances. The display apparatus of the present disclosure may be applied to an organic light emitting lamp apparatus or an inorganic light emitting lamp apparatus. If the vibration member is applied to the lamp apparatus, the vibration member may serve as a lamp and a speaker. If the vibration member is applied to mobile apparatuses, the vibration member may serve as a receiver and a speaker.

A display apparatus according to an embodiment of the present disclosure will be described as follows.

A display apparatus according to an embodiment the present disclosure may comprise a display panel configured to display an image; a plate on a surface of the display panel; a rear structure on a surface of the plate opposite to the display panel and configured to support the display panel; a vibration member configured to vibrate the plate; and a first supporting member between a periphery of the plate and the rear structure.

In the display apparatus according to the present disclosure, the vibration member may be on a surface of the plate facing the display panel. Further, the vibration member may be on a first surface of the plate, and the first supporting member may be on a second surface of the plate opposite to the first surface, wherein the first supporting member does not overlap the vibration member. The first supporting member may be in contact with at least two peripheries of the surface of the plate opposite to the display panel.

In the display apparatus according to the present disclosure, the display apparatus may further comprise a first adhesive member between a center portion of the vibration member and the display panel, wherein portions of the vibration member around the center portion are spaced apart from the display panel. The first adhesive member may have a higher rigidity than that of the first supporting member.

In the display apparatus according to the present disclosure, the display apparatus may further comprise a second supporting member between the periphery of the plate and the display panel. The second supporting member may be in contact with at least two peripheries of a surface of the plate facing the display panel. The vibration member may be on a surface of the plate facing the display panel, and the second supporting member may be spaced apart from the vibration member and disposed in the periphery of the plate. The second supporting member may overlap the first supporting member.

In the display apparatus according to the present disclosure, the display apparatus may further comprise a second adhesive member between a center portion of the plate and the display panel; and a third adhesive member between the periphery of the plate and the display panel. The vibration member may be on the surface of the plate opposite to the display panel, and the third adhesive member is on a front surface of the plate so as not to overlap the vibration member. The first supporting member may be in contact with at least two peripheries of the surface of the plate opposite to the display panel. The third adhesive member may be in contact with at least two peripheries of the front surface of the plate. Each of the second and third adhesive members may have a higher rigidity than that of the first supporting member. The first supporting member may overlap the third adhesive member.

In the display apparatus according to the present disclosure, the vibration member may include first portions having a piezoelectric property, and second portions between the first portions having flexibility.

In the display apparatus according to the present disclosure, the vibration member may include a composite film.

A display apparatus according to an embodiment of the present disclosure may comprise a display apparatus comprises a display panel configured to display an image; a rear structure configured to support the display panel; and a plurality of sound generating modules between the display panel and the rear structure and configured to vibrate the display panel, wherein each of the plurality of sound generating modules includes: a plate between the display panel and the rear structure; a vibration member configured to vibrate the plate; and a first supporting member between a periphery of the plate and the rear structure.

In the display apparatus according to the present disclosure, each of the plurality of sound generating modules may further include a first adhesive member between a center portion of the vibration member and the display panel, wherein the vibration member is on a first surface of the plate, and wherein the first supporting member is on a second surface of the plate opposite to the first surface such that the first supporting member is spaced apart from the vibration member with respect to a direction parallel to the surface of the plate.

In the display apparatus according to the present disclosure, each of the plurality of sound generating modules further includes a first adhesive member between a center portion of the vibration member and the display panel, and the first supporting member is on a surface of the plate without the vibration member so as not to overlap the vibration member.

In the display apparatus according to the present disclosure, each of the plurality of sound generating modules may further include a second supporting member between the periphery of the plate and the display panel.

In the display apparatus according to the present disclosure, each of the plurality of sound generating modules may further include a second adhesive member between the center portion of the plate and the display panel; and a third adhesive member between the periphery of the plate and the display panel.

It will be apparent to those skilled in the art that various modifications and variations can be made in the display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display apparatus, comprising:
- a display panel configured to display an image;
- a plate at a rear surface of the display panel;
- a rear structure at a surface of the plate opposite to the display panel;
- a vibration member configured to vibrate the plate;
- a first supporting member between a periphery of the plate and the rear structure;
- a second supporting member between a periphery of the plate and the display panel; and
- a support portion interposed between a periphery of the rear surface of the display panel and a periphery of a front surface of the rear structure, wherein:
- the first and second supporting members overlap each other with the vibration member therebetween and do not overlap the vibration member;
- an entire front surface of the vibration member faces the rear surface of the display panel, and a rear surface of the vibration member is connected to the plate;
- the support portion does not overlap the plate along a thickness direction of the display apparatus; and
- an outer side edge of the plate and an outer side edge of the first supporting member are aligned to each other along the thickness direction of the display apparatus.

2. The display apparatus according to claim 1, wherein the vibration member is at a first surface of the plate, and the first supporting member is at a second surface of the plate opposite to the first surface.

3. The display apparatus according to claim 1, wherein the first supporting member is in contact with at least two peripheries of the surface of the plate opposite to the display panel.

4. The display apparatus according to claim 1, wherein:
- the vibration member includes first portions and second portions;
- the first portions have a piezoelectric property;
- the second portions are disposed between the first portions; and
- the second portions have flexibility.

5. The display apparatus according to claim 1, wherein the vibration member includes a composite film.

6. The display apparatus according to claim 1, wherein the vibration member is between the plate and the display panel.

7. The display apparatus according to claim 1, wherein the vibration member is at a front surface of the plate.

8. The display apparatus according to claim 1, wherein the vibration member is spaced apart from the rear surface of the display panel.

9. The display apparatus according to claim 1, wherein the vibration member includes a plurality of first portions and a plurality of second portions, and the plurality of the first portions and the plurality of the second portions respectively are disposed on a same plane in parallel.

10. The display apparatus according to claim 1, wherein the second supporting member overlaps the first supporting member.

11. The display apparatus according to claim 10, wherein the second supporting member is in contact with at least two peripheries of the surface of the plate facing the display panel.

12. The display apparatus according to claim 10, wherein the second supporting member and the vibration member are disposed on a same plane in parallel.

13. The display apparatus according to claim 1, wherein:

the vibration member comprises first portions and one or more second portions;

a first one of the first portions is spaced apart from a second one of the first portions along a direction perpendicular to a thickness direction of the vibration member; and one of the one or more second portions is disposed between the first one and the second one of the first portions.

14. The display apparatus according to claim 1, wherein:

compared to a side edge of the display panel, a side edge of the support portion is located closer to a center axis of the display apparatus; and the side edge of the display panel, the side edge of the support portion, and the center axis are parallel to the thickness direction of the display apparatus.

15. The display apparatus according to claim 14, further comprising a sidewall portion, wherein the sidewall portion is coupled to and surrounds the side edge of the display panel, a second side edge of the support portion, and a side edge of the rear structure.

16. The display apparatus according to claim 1, wherein:

an outer side edge of the first supporting member, an outer side edge of the plate, and an outer side edge of the second supporting member are aligned to one another along the thickness direction of the display apparatus; and an inner side edge of the first supporting member and an inner side edge of the second supporting member are aligned to each other along the thickness direction of the display apparatus.

17. The display apparatus according to claim 1, wherein the first supporting member increases a vibration of the plate when the vibration member is vibrated.

18. The display apparatus according to claim 1, wherein each of the first and second supporting members has an elasticity that is higher than an elasticity of the plate.

19. A display apparatus, comprising:

a display panel configured to display an image;

a rear structure at a rear surface of the display panel;

a plurality of sound generating modules between the display panel and the rear structure and configured to vibrate the display panel to generate sound; and a support portion interposed between a periphery of the rear surface of the display panel and a periphery of a front surface of the rear structure, wherein each of the plurality of sound generating modules includes:

a plate between the display panel and the rear structure;

a vibration member configured to vibrate the plate;

a first supporting member between a periphery of the plate and the rear structure; and a second supporting member between a periphery of the plate and the display panel, wherein:

the first and second supporting members overlap each other with the vibration member therebetween and do not overlap the vibration member;

an entire front surface of the vibration member faces the rear surface of the display panel, and a rear surface of the vibration member is connected to the plate; and the support portion does not overlap the plate along a thickness direction of the display apparatus, and wherein an outer side edge of the plate and an outer side edge of the first supporting member are aligned to each other along the thickness direction of the display apparatus.

20. The display apparatus according to claim 19, wherein the vibration member is at a first surface of the plate, and wherein the first supporting member is at a second surface of the plate opposite to the first surface.

21. The display apparatus according to claim 19, wherein the vibration member is between the plate and the display panel.

22. The display apparatus according to claim 19, wherein the vibration member is at a front surface of the plate.

23. The display apparatus according to claim 19, wherein:

the vibration member includes first portions and second portions;

the first portions have a piezoelectric property;

the second portions are between the first portions; and the second portions have flexibility.

24. The display apparatus according to claim 19, wherein the vibration member includes a composite film.

25. The display apparatus according to claim 19, wherein the vibration member includes a plurality of first portions and a plurality of second portions, and the plurality of the first portions and the plurality of the second portions respectively are disposed on a same plane in parallel.

26. The display apparatus according to claim 19, wherein the second supporting member overlaps the first supporting member.

27. The display apparatus according to claim 19, wherein the second supporting member is in contact with at least two peripheries of a surface of the plate facing the display panel.

28. The display apparatus according to claim 19, wherein the second supporting member and the vibration member are disposed on a same plane in parallel.

29. The display apparatus according to claim 19, wherein:

the vibration member comprises first portions and one or more second portions;

a first one of the first portions is spaced apart from a second one of the first portions along a direction perpendicular to a thickness direction of the vibration member; and one of the one or more second portions is disposed between the first one and the second one of the first portions.

30. The display apparatus according to claim 19, wherein:

compared to a side edge of the display panel, a side edge of the support portion is located closer to a center axis of the display apparatus; and the side edge of the display panel, the side edge of the support portion, and the center axis are parallel to the thickness direction of the display apparatus.

31. The display apparatus according to claim 30, further comprising a sidewall portion, wherein the sidewall portion is coupled to and surrounds the side edge of the display panel, a second side edge of the support portion, and a side edge of the rear structure.

32. The display apparatus according to claim 19, wherein:

an outer side edge of the first supporting member, an outer side edge of the plate, and an outer side edge of the second supporting member are aligned to one another along the thickness direction of the display apparatus; and an inner side edge of the first supporting member and an inner side edge of the second supporting member are aligned to each other along the thickness direction of the display apparatus.

33. The display apparatus according to claim 19, wherein the first supporting member increases a vibration of the plate when the vibration member is vibrated.

34. The display apparatus according to claim 19, wherein each of the first and second supporting members has an elasticity that is higher than an elasticity of the plate.

* * * * *